United States Patent
Askey et al.

(10) Patent No.: US 9,369,700 B2
(45) Date of Patent: *Jun. 14, 2016

(54) SYSTEMS AND METHODS FOR LENS CHARACTERIZATION

(71) Applicant: Amazon Technologies, Inc., Seattle, WA (US)

(72) Inventors: Philip Askey, London (GB); Andrew C G Westlake, Beckenham (GB); Jaysen B. Marais, London (GB); Simon Ashley Joinson, West Sussex (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,450

(22) Filed: Sep. 2, 2015

(65) Prior Publication Data

US 2015/0381976 A1    Dec. 31, 2015

Related U.S. Application Data

(63) Continuation of application No. 14/610,754, filed on Jan. 30, 2015, now Pat. No. 9,143,698, which is a continuation of application No. 14/141,313, filed on Dec. 26, 2013, now Pat. No. 8,976,251, which is a continuation of application No. 13/487,827, filed on Jun. 4, 2012, now Pat. No. 8,629,909, which is a continuation of application No. 12/360,041, filed on Jan. 26, 2009, now Pat. No. 8,194,136.

(51) Int. Cl.
| | |
|---|---|
| *H04N 17/00* | (2006.01) |
| *H04N 5/232* | (2006.01) |
| *H04N 5/235* | (2006.01) |
| *H04N 5/238* | (2006.01) |
| *G01M 11/02* | (2006.01) |
| *G06T 11/20* | (2006.01) |
| *G06F 3/0484* | (2013.01) |
| *G06F 3/0482* | (2013.01) |

(52) U.S. Cl.
CPC ............ *H04N 17/002* (2013.01); *G01M 11/02* (2013.01); *G01M 11/0264* (2013.01); *G06F 3/0482* (2013.01); *G06F 3/04842* (2013.01); *G06F 3/04847* (2013.01); *G06T 11/206* (2013.01); *H04N 5/238* (2013.01); *H04N 5/2351* (2013.01); *H04N 5/23206* (2013.01)

(58) Field of Classification Search
CPC . H04N 5/2351; H04N 5/238; H04N 5/23206; G06F 3/0482; G06T 11/26
See application file for complete search history.

(56) References Cited

U.S. PATENT DOCUMENTS

| | | | |
|---|---|---|---|
| 4,053,934 | A | 10/1977 | Kornreich et al. |
| 5,699,440 | A | 12/1997 | Carmeli |

(Continued)

*Primary Examiner* — Brian Yenke
(74) *Attorney, Agent, or Firm* — Knobbe, Martens, Olson & Bear LLP

(57) ABSTRACT

Methods and systems for analyzing camera lenses and presenting information regarding camera lenses performance are described. An interactive user interface is provided over a network for display on a user terminal by a computer system. A user request is received at the computer system from the user terminal for lens data from a first lens. Lens data, including test data obtained via a first digital image captured using the first lens at the first focal length setting and the first aperture setting is accessed from memory and transmitted to interactive user interface. The interactive user interface is configured to display an identification of the first camera body, an identification of the first lens, the first focal length setting used to capture the image, and the first aperture setting used to capture the image. Using the lens test data, the interactive user interface generates and displays sharpness graph data.

20 Claims, 15 Drawing Sheets

(56) References Cited

U.S. PATENT DOCUMENTS

| | | | |
|---|---|---|---|
| 5,918,192 A | 6/1999 | Tomaszewski | |
| 5,999,213 A | 12/1999 | Tsushima et al. | |
| 6,256,058 B1 | 7/2001 | Kang et al. | |
| 6,344,916 B1 | 2/2002 | Chin | |
| 6,608,651 B2 | 8/2003 | Mabuchi et al. | |
| 6,707,500 B1 | 3/2004 | Tamura et al. | |
| 6,795,165 B2 | 9/2004 | Uchiyama | |
| 6,931,602 B1 | 8/2005 | Silver et al. | |
| 7,023,472 B1 | 4/2006 | Kang et al. | |
| 7,151,560 B2 | 12/2006 | Matherson et al. | |
| 7,151,570 B2 | 12/2006 | Kaneda | |
| 7,260,597 B1 | 8/2007 | Hofrichter et al. | |
| 7,289,655 B2 | 10/2007 | Kitabayashi | |
| 7,301,560 B2 | 11/2007 | Noma et al. | |
| 7,305,114 B2 | 12/2007 | Wolff et al. | |
| 7,489,335 B2 | 2/2009 | Kochi et al. | |
| 7,616,314 B2 | 11/2009 | Kreysar et al. | |
| 7,629,998 B2 | 12/2009 | Elberbaum | |
| 7,671,891 B2 | 3/2010 | Fitzgibbon et al. | |
| 7,864,218 B2 | 1/2011 | Kusaka et al. | |
| 7,872,688 B2 | 1/2011 | Relan et al. | |
| 7,889,233 B2 | 2/2011 | Mead et al. | |
| 8,330,830 B2 | 12/2012 | Manico et al. | |
| 8,345,140 B2 | 1/2013 | Nagata | |
| 8,405,720 B2 | 3/2013 | Gupta et al. | |
| 8,405,727 B2 | 3/2013 | Gere et al. | |
| 8,441,470 B2 | 5/2013 | Hibi | |
| 2003/0137587 A1 | 7/2003 | Braun | |
| 2004/0066456 A1 | 4/2004 | Read | |
| 2004/0103233 A1* | 5/2004 | Shinkai | G11B 27/031 710/260 |
| 2004/0189805 A1 | 9/2004 | Seitz | |
| 2005/0073530 A1 | 4/2005 | Kapur et al. | |
| 2005/0174591 A1 | 8/2005 | Sowinski et al. | |
| 2005/0261849 A1 | 11/2005 | Kochi et al. | |
| 2006/0230312 A1 | 10/2006 | Nichols et al. | |
| 2007/0253691 A1 | 11/2007 | Hsu | |
| 2008/0019669 A1* | 1/2008 | Girshick | G06F 17/30793 386/224 |
| 2009/0027504 A1 | 1/2009 | Lim et al. | |
| 2009/0213224 A1 | 8/2009 | Zandifar et al. | |
| 2009/0273680 A1 | 11/2009 | Palum | |
| 2010/0259622 A1 | 10/2010 | Steinberg et al. | |
| 2010/0289869 A1 | 11/2010 | Chen et al. | |
| 2012/0307108 A1* | 12/2012 | Forutanpour | G06T 7/0067 348/231.3 |
| 2013/0070107 A1 | 3/2013 | Tapes | |
| 2013/0128056 A1 | 5/2013 | Chuang et al. | |

* cited by examiner

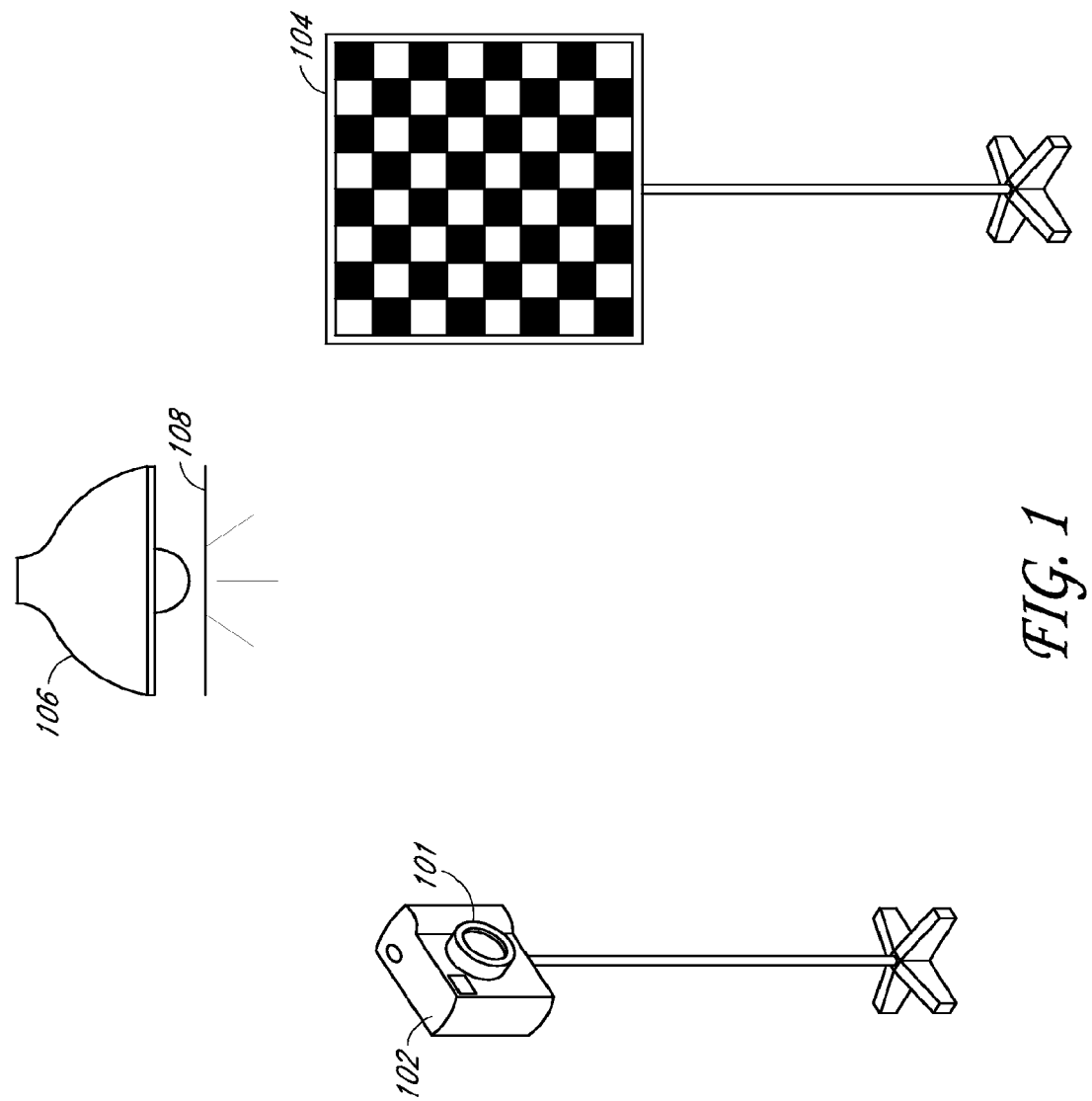

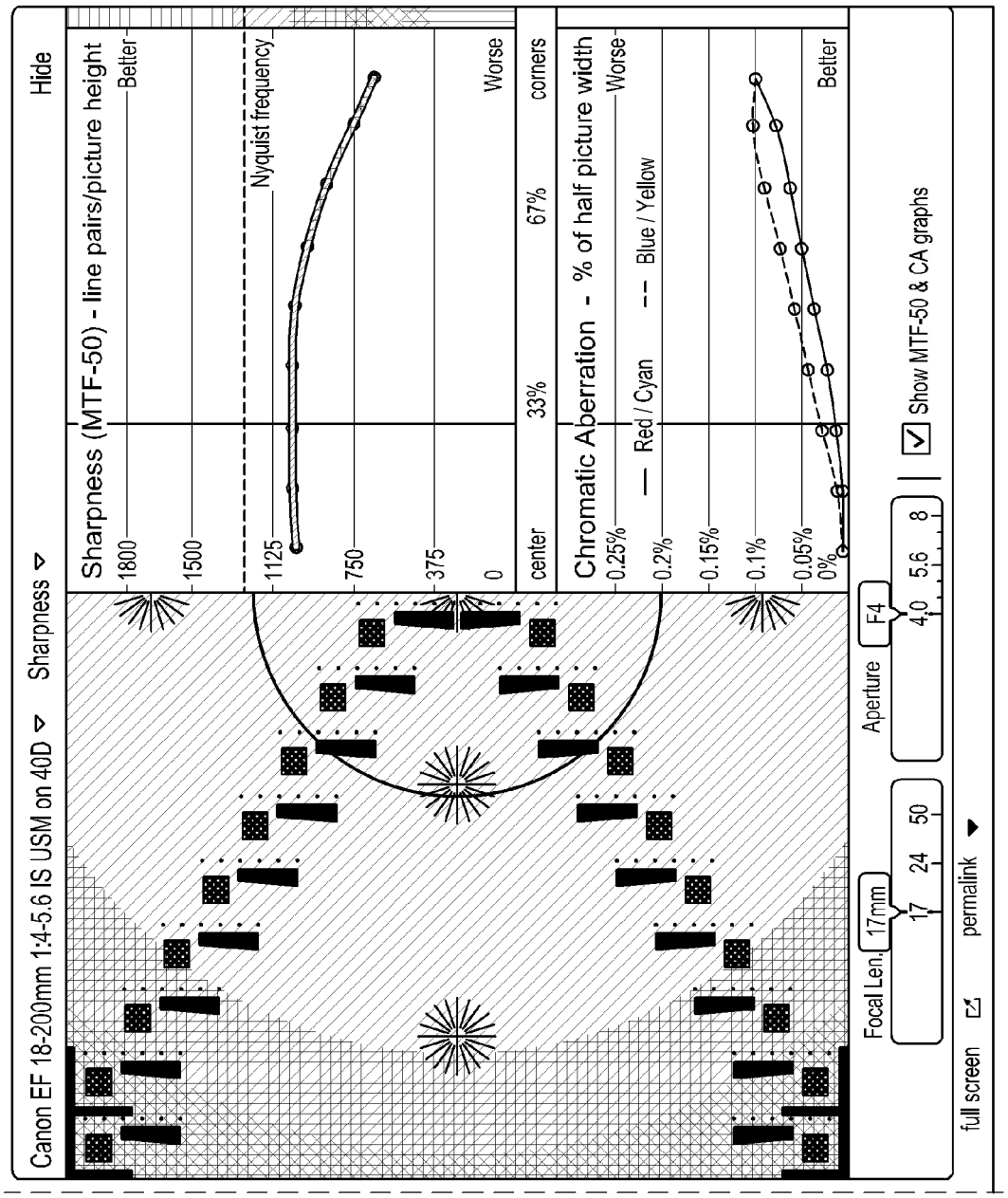

SYSTEMS AND METHODS FOR LENS CHARACTERIZATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

Description of the Related Technology

Camera lenses are critical to the quality of photographic images. Further, camera lenses, such as those of single lens reflex cameras or rangefinder cameras configured to receive interchangeable lenses, are often expensive investments for both amateur and professional photographers. Indeed, quality lenses often cost hundreds and sometimes thousands of dollars and often cost more than camera bodies. However, lens quality may be adversely affected by numerous factors related to optical performance.

BRIEF DESCRIPTION OF THE DRAWINGS

Specific embodiments will now be described with reference to the drawings, which are intended to illustrate and not limit various features of the inventions.

FIG. 1 illustrates an example lens testing configuration.

FIGS. 9-1, 9-2 illustrate example embodiments of a lens comparison analysis.

DETAILED DESCRIPTION OF PREFERRED EMBODIMENTS

Figure 2:
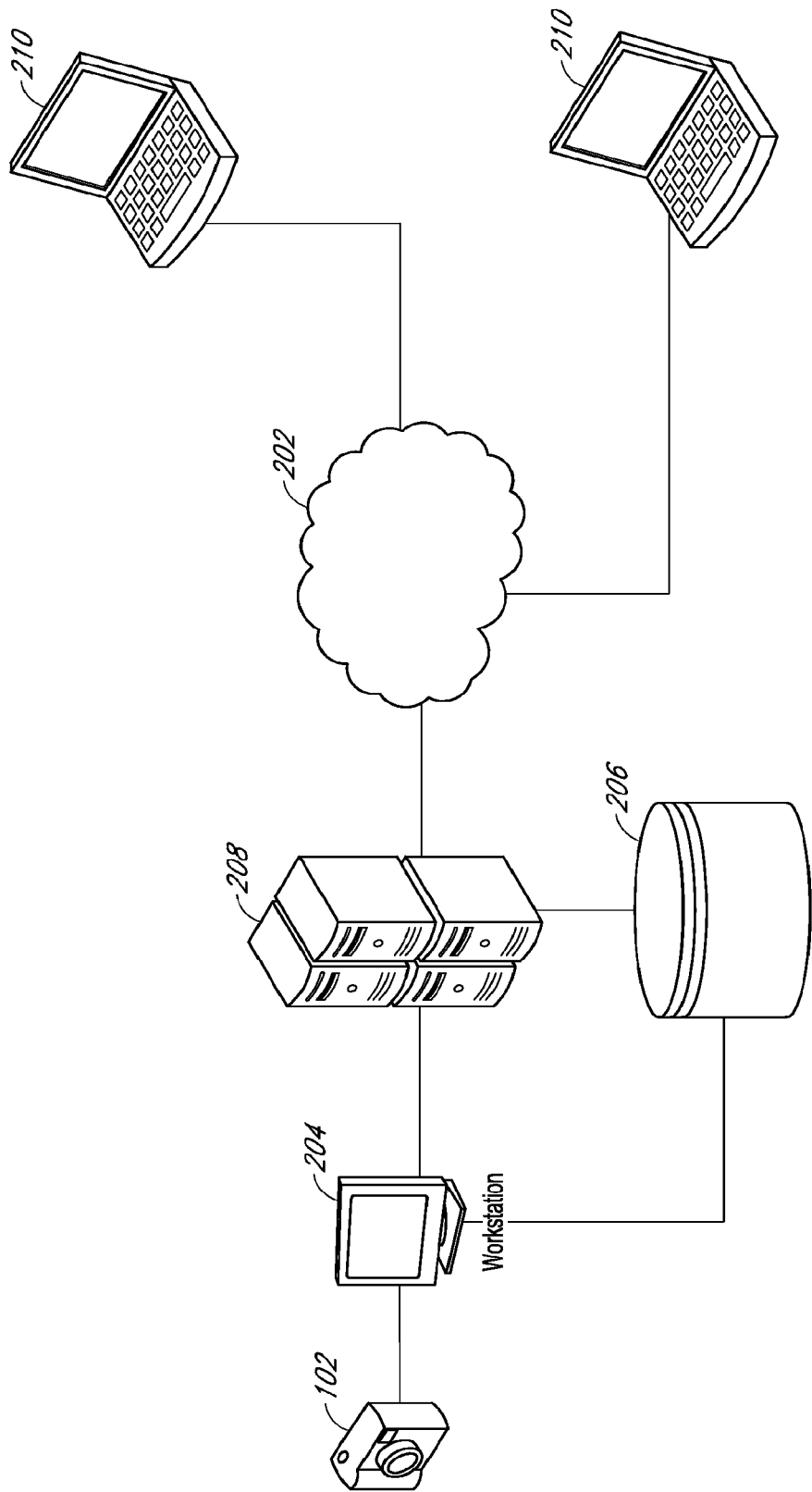
FIG. 2 illustrates an example system architecture.

Methods and systems are provided for measuring, analyzing, and/or providing analysis results of optical characteristics of optical articles, such as camera lenses. For example, certain embodiments measure, analyze, and/or provide analysis results of some or all of the following characteristics: sharpness, chromatic aberration, distortion, vignetting, and other characteristics. Further, certain optional embodiments enable a user to visually experiment with certain lens parameters, such as focal length and aperture and to view the effects on lens performance. Further, certain embodiments optionally enable a user to compare the performance and characteristics of two or more lenses.

As will be described below, in certain optional embodiments, an image of a test pattern chart is captured using a lens to be characterized. The resulting photograph is optionally processed and analyzed. The results are presented to a user via a network resource, such as a Web page displayed in a browser or otherwise, via a widget embedded in a Web page, via a standalone dedicated software application, or otherwise.

The lens characteristics discussed above (e.g., sharpness, chromatic aberration) and/or other characteristics may be measured using the following techniques and/or other techniques.

In order to measure certain lens characteristics, test images are shot using the lens mounted on a camera body (e.g., a digital camera body or a film camera body). Optionally, (e.g., where a digital camera is being used) the shot may be captured in an unreduced format, such as a RAW format (e.g., using one of a camera manufacturer formatting standard, such as Canon's .CRW and .CR2 formats, Sony's .ARW format, Pentax's .PEF format, Panasonic's .RAW and .RW2 formats, Olympus' .ORF format, Nikon's .NEF format, Adobe's open standard format .DNG, or other format). Optionally, the shot is taken at the camera's base sensitivity setting (as described under ISO 12232:2006). The captured digitized image is then stored in memory. For example, the digital image may initially be stored in the camera's memory, and then transferred to the memory of an image processing computer system, such as that described below.

Optionally, the RAW file data is processed using a common converter, with sharpening disabled, in order to reduce or eliminate differences that might otherwise result from in-camera processing. For example, many current cameras can apply lens aberration correction to image files (e.g., a JPEG file). Examples of such lens aberration correction include automatic correction of lateral chromatic aberration and automatic peripheral illumination (falloff) correction, performed using software and/or hardware image processors. Using JPEG files having such correction applied may therefore not provide a true description of the lens itself. By contrast, a RAW file is generally uncorrected by digital cameras. However, optionally JPEG or other processed image files may be used.

Image data captured using the processes described herein or otherwise is optionally stored in camera memory and then transferred to another computer system, such as a computer system hosting image processing software and/or hardware configured to analyze image data to thereby analyze and characterize the lens, format the results of the analysis and characterization, and generate data and formatting instructions to be used in displaying image and analysis data to a user (e.g., in the form of an HTML web page, optionally using XML, FLASH format (e.g., SWF), etc.).

Sharpness Measurement

Sharpness is optionally measured using a test chart including a pattern with multiple arms (e.g., four arms) extending from the centre towards or to each corner of the frame. Sharpness is optionally calculated from slanted-edge patterns arranged across the frame. The system then generates display data which may be transmitted over a network to a user terminal for display, wherein the sharpness data is obtained by using a statistical function, such as by averaging the results from slanted-edge patterns, to thereby provide an accurate representation of the lens's sharpness performance.

By way of further example, a relatively large test chart (e.g., approximately 3 meter×2 meter, 2.66 meter×2 meter, 6 meter×4 meter, etc.) may optionally be used, which provides for a relatively more realistic working distance as compared to the working distance employed for the A0 size charts conventionally used (for example, using a 24 mm equivalent lens, the subject distance is 2 m as opposed to 0.72 m). Optionally, to reduce the space needed for taking photographs of test images, a smaller chart (e.g., approximately 1.05 meter×0.7 meter, 0.8 meter×0.55 meter, etc.) may be used for relatively longer focal lengths (e.g., greater than about 50 mm). For example, such a test chart provides a shooting distance of about 30× the 35 mm-equivalent focal length of the lens.

Optionally, if available, a magnified manual focus in live view is used, which tends to be relatively reliable and consistent. Optionally, (e.g., on cameras that do not feature live view), focus is established by determining the approximate maximum sharpness obtainable from the lens. Optionally, two or more replicate data sets are shot to confirm reproducibility of the results. Optionally instead, only a single data set is shot.

Distortion Measurement

Optionally, to measure distortion, a test chart with a grid pattern is selected for use. The test chart is then aligned with the camera. Optionally, images are shot in processed, compressed format (e.g., a JPEG format). Optionally, the images are shot in unprocessed/uncompressed format (e.g., a RAW format). The images are then analyzed, and translated to data displayed to a user. As distortion is relatively independent of aperture, optionally the distortion images are shot at F8, although lower or higher F-stops may be used. Optionally, the test chart is approximately 1.05 meter×0.7 meter, 0.93 meter×0.7 meter, or other size.

Falloff Measurement

Optionally, falloff measurements are performed by shooting a relatively evenly illuminated white surface through a filter (e.g., a highly diffusing filter). Optionally, the image is stored using the JPEG format or other processed or unprocessed format, with in-camera vignetting correction turned off (e.g., where the correction corrects for vignetting, wherein the vignetting may be in the form of dark corners in the image resulting from the barrel or sides of the lens becoming visible). The data is processed, and the processed data is then provided for display.

For example, grayscale values may be derived from the original image files, which are then provided for display via a user terminal. The falloff value in stops is calculated using the measured tone curve of the camera body used for testing.

Lens Testing Configuration

Figures 1, 9:
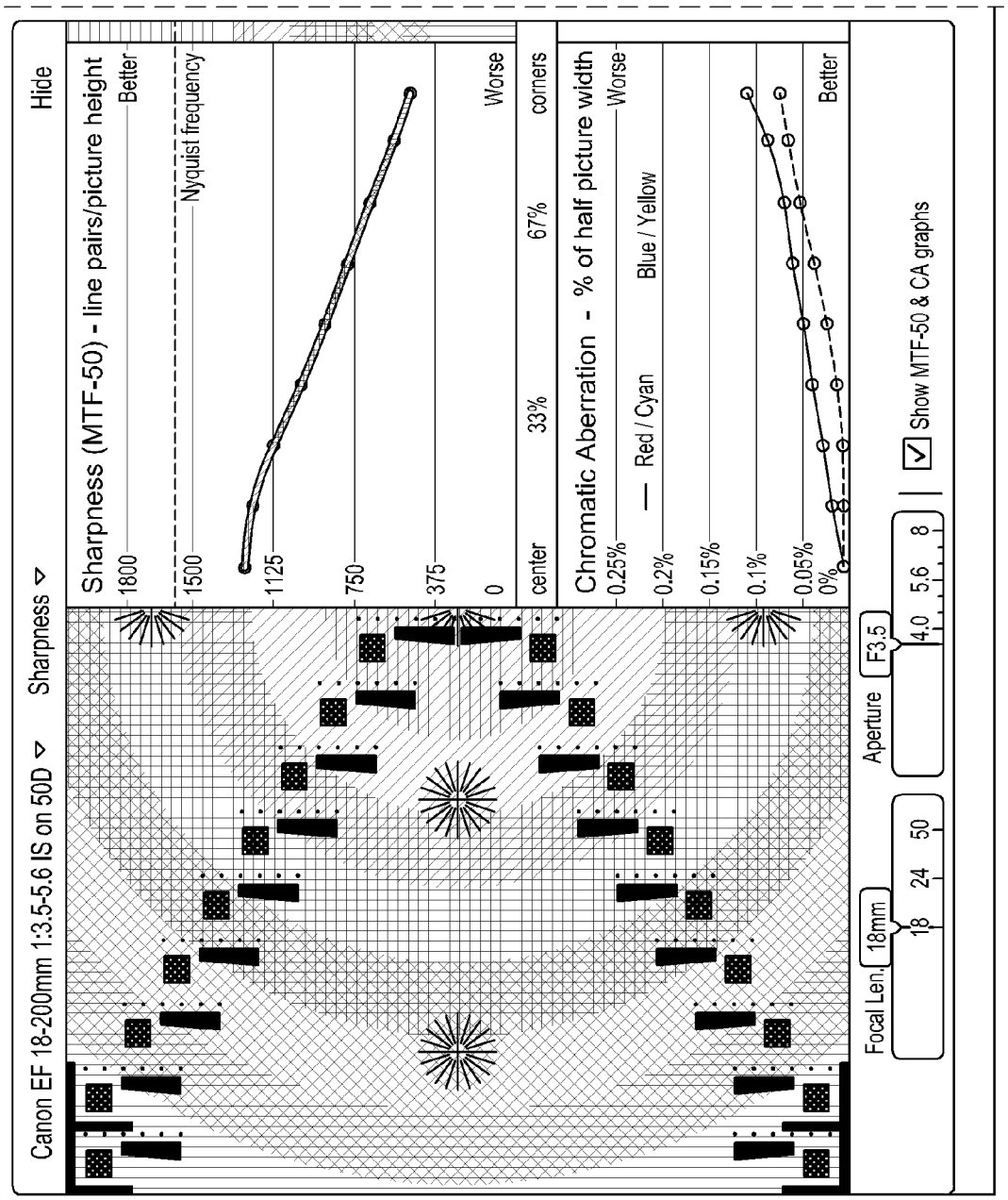

FIG. 1 illustrates an example lens-testing configuration. In this example, a camera body 102 (e.g., an SLR camera body) has a lens 101 which is to be characterized mounted thereon. The camera body 102 may be a digital camera body including a digital image sensor (e.g., a CCD or CMOS image sensor). The digital image sensor includes a plurality of pixels that convert light into electrical signals. The camera body 102 further includes a control system, including one or more processors that process and store the image in volatile and/or nonvolatile fixed and/or removable memory (e.g., a FLASH device). The control system optionally processes and stores an image in one or more file formats (e.g., Joint Photography Experts Group standard (JPEG) format, Tagged Image File Format (TIFF), RAW, and/or other formats).

The camera control system may be further configured to provide one or more types of correction with respect to an image, such as vignetting correction, lens aberration correction, automatic correction of lateral chromatic aberration, automatic peripheral illumination (falloff) correction, anti/shake correction, and/or other types of correction. The processors may further be configured to provide automatic and/or manual focus.

The camera body may include an optical viewfinder and/or electronic display (e.g., an LCD, OLED, CRT, or other type of electronic display) that act as a live view viewfinder, may display images captured by the image sensor, and may display status and camera control information. In addition, the camera body may include user accessible controls via which the user can set camera modes, turn on/off various forms of image correction, control camera flash, control camera focus and/or aperture, select focusing mode, activate the camera shutter and/or control other areas of the camera performance.

The camera body 102 may include a digital port and/or a wireless interface via which digital images captured with the camera body 102 may be transferred to another system (e.g., a computer system).

The lens 101 may be, by way of example, a zoom lens with a variable focal length or a fixed focal length lens. The lens may be an autofocus and/or a manual focus lens.

While the camera 102 may be a DSLR camera, a rangefinder camera, a compact camera, a video camera, or other camera type with a fixed or a removable lens.

The camera body 102 is mounted on a stand (e.g., a tripod), which may enable the height of the camera to be adjusted and may include one or more joints to allow the camera 102 to pan and tilt. The camera 102 (including the lens) is positioned at the appropriate distance from a test image 104 illuminated via one or more lights 106, optionally using a diffuser 108.

As will be discussed below, certain embodiments transmit lens data, and analysis data related thereto, over a network for presentation to a user via an interactive user interface (which may be in the form of a widget). For example, the lens data may be formatted for display purposes, transmitted from a server over a network (e.g., the Internet), to a user terminal (e.g., a personal computer, a laptop computer, an interactive television, a networked video game, a smart phone, or other processor based device), which then displays the lens data via the interactive user interface. Optionally, the lens data is stored in an XML file which is accessed by the interactive user interface widget for display to the user. Optionally, the widget is implemented using one or more of the follow HTML, XML, AJAX, FLASH®, Silverlight™, JavaFX™, or otherwise.

For a given test image, the camera 102 file format is set to a desired format, one or more forms of image correction are turned on or off, the focus and/or aperture are set appropriately, as is the lighting. Optionally, the light diffuser 108 is used as appropriate.

Captured images can then be transferred to an image analysis system that analyzes, processes and stores data in a database. The data from the database may then be served to one or more user terminals via an interactive user interface as discussed in greater detail below.

System Architecture

FIG. 2 illustrates an example system architecture for transferring images, processing images, and serving image and lens related data to one or more user terminals. The camera 102 (or a memory device storing images, such as removable nonvolatile memory) is connected via a wired or wireless connection to an image processing system 204. The image processing system 204 processes, transforms, and formats image data captured via the camera body 102 and the lens 101 to provide lens related data for the interactive user interface as described in greater detail below.

The output of the image processing system 204 is stored in a database 206. For example, a database record for a given lens may include sharpness measurement data at various focal lengths (for a zoom lens) and aperture settings at various points across an image, as well as chromatic aberration measurement data, distortion data, falloff data and/or other data. By way of example, chromatic aberration (also referred to "color fringing") may be caused by the camera lens failing to focus different wavelengths of light onto the same focal plane (that is, the focal length for different wavelengths is different) and/or by the lens magnifying different wavelengths differently. These types of chromatic aberration are referred to as "longitudinal chromatic aberration" and "lateral chromatic aberration" respectively. Longitudinal chromatic aberration and lateral chromatic aberration can occur concurrently. The amount of chromatic aberration may depend on the dispersion of the lens material (e.g., glass, plastic, and/or liquid).

The database 206 is connected to a web server system 208 that serves the data in response to user requests over a network 202 (e.g., the Internet) to one or more user terminals 210 (e.g., a laptop computer, desktop computer, mobile phone, interactive television, networked game machine, networked camera, or entertainment system, etc.).

As will be described, the interactive user interface enables users to explore and investigate the optical characteristics of a lens. Further, the interactive user interface optionally enables a user to select two (or optionally more) lenses for comparison, and instruct an analysis program (e.g., included as part of the widget code or available via the widget), to provide comparison data for the selected lenses. A plurality of display modes are provided via the interactive user interface, such as modes for displaying data regarding some or all of the following: sharpness, chromatic aberration, distortion, and vignetting. Lens test data may be captured and presented for some or all marked focal lengths on the lens being characterized.

As discussed above, unlike certain conventional systems, certain optional embodiments described herein provide adequate data on chromatic aberration, distortion and vignetting, in addition to sharpness, as chromatic aberration, distortion and vignetting may have a more destructive effect on perceived image quality than lens softness.

Interactive User Interfaces

Figure 3:
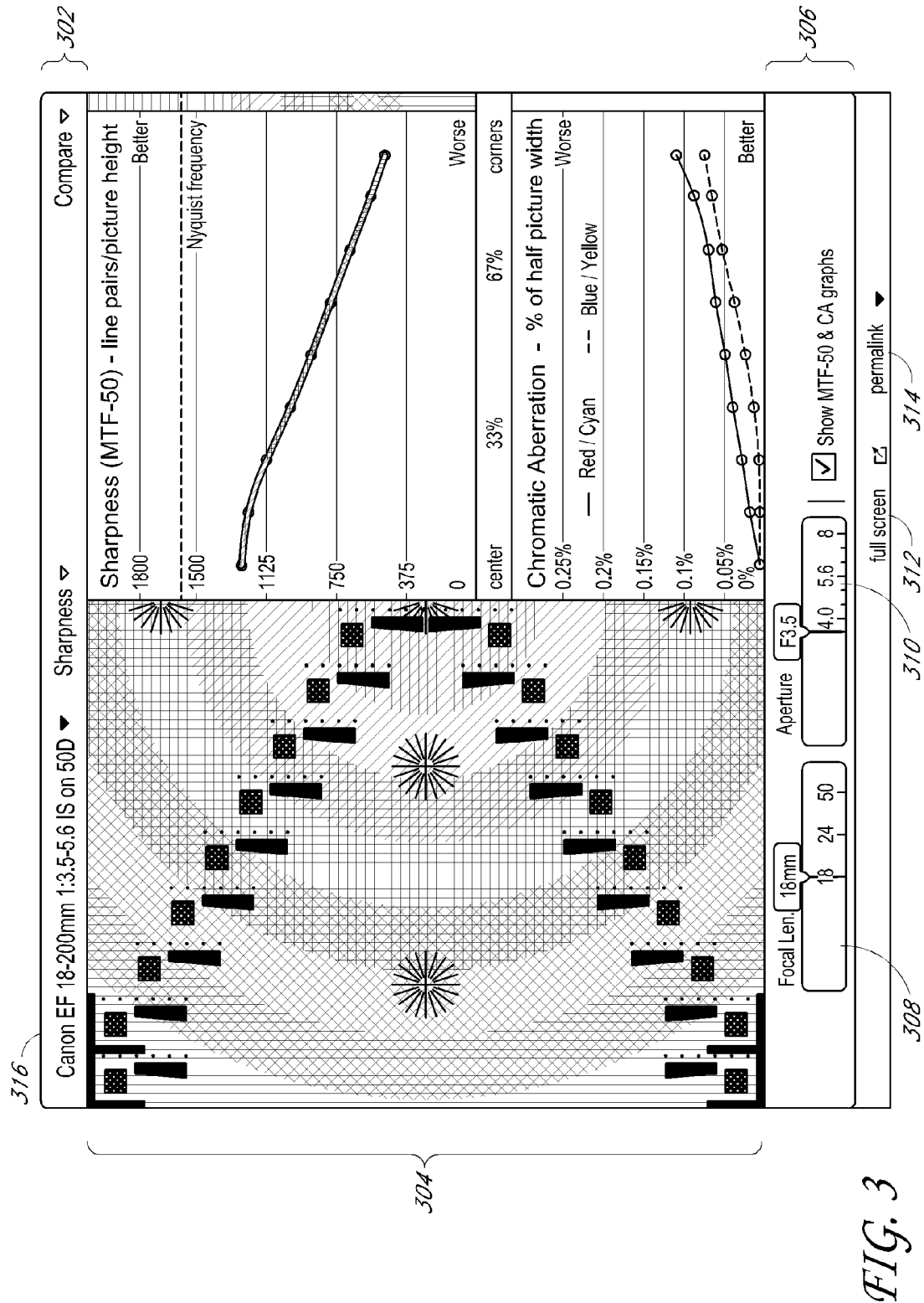
FIG. 3 illustrates an example embodiment of an interactive user interface.

FIG. 3 illustrates an example user interface presenting lens data and analysis for a certain lens and camera body. The user interface may have been accessed by a user via a link/menu selection in a list of lens reviews on a lens review site, via an entry/link on a blog, forum, social network page, online commerce site hosting an online catalog of items available for purchase, etc. Optionally, as described below, the user may select the lens and/or camera body via the interactive user interface itself.

In the example illustrated in FIG. 3, sharpness data and analysis are presented. However, via an attribute selection menu, the user can select other attributes, such as chromatic aberration, distortion, and falloff.

A first mode of the interactive user interface includes some or all of the following: menus 302, a graphical data display 304, and user controls and data readouts 306. A user can select the desired focal length and aperture using corresponding controls 308, 310 (e.g., using a mouse, cursor keys, a touch screen, or other user input device). For example, the focal length and aperture can be increased or decreased using such user input.

Optionally, the user interface includes a full screen mode control 312, which when activated causes the interactive user interface to expand (e.g., to occupy the entire screen of a user display or a substantial portion thereof). Optionally, the user interface includes a permalink generation control 314, which when activated causes a link to the current state of the interactive user interface to be generated. The user can embed the link on one or more web pages on one or more websites, so the user and/or others can access and view the display. For example, the user can embed the link in a forum, blog, ecommerce site (e.g., in a user submitted review of the lens), or social networking page to illustrate a discussion regarding a lens or other topic.

In the illustrated example, the lens for which data is being displayed is a zoom lens (18-200 mm, 1:3.5-5.6) on a specified camera body, as reported via display area 316. As previously discussed, the user can select the focal length and the aperture and the interactive user interface will display (e.g., via data display 304) the selected performance criteria (e.g., sharpness) at that focal length and aperture. For example, measurements may be provided at some or all of the focal lengths marked on the lens, optionally using whole stop aperture increments for zoom lenses, and optionally using third stop increments for prime (fixed focal length) lenses, although other aperture increments can be used. Thus, the user can experiment by selecting a variety of tested combinations of focal length and aperture.

Figure 4:
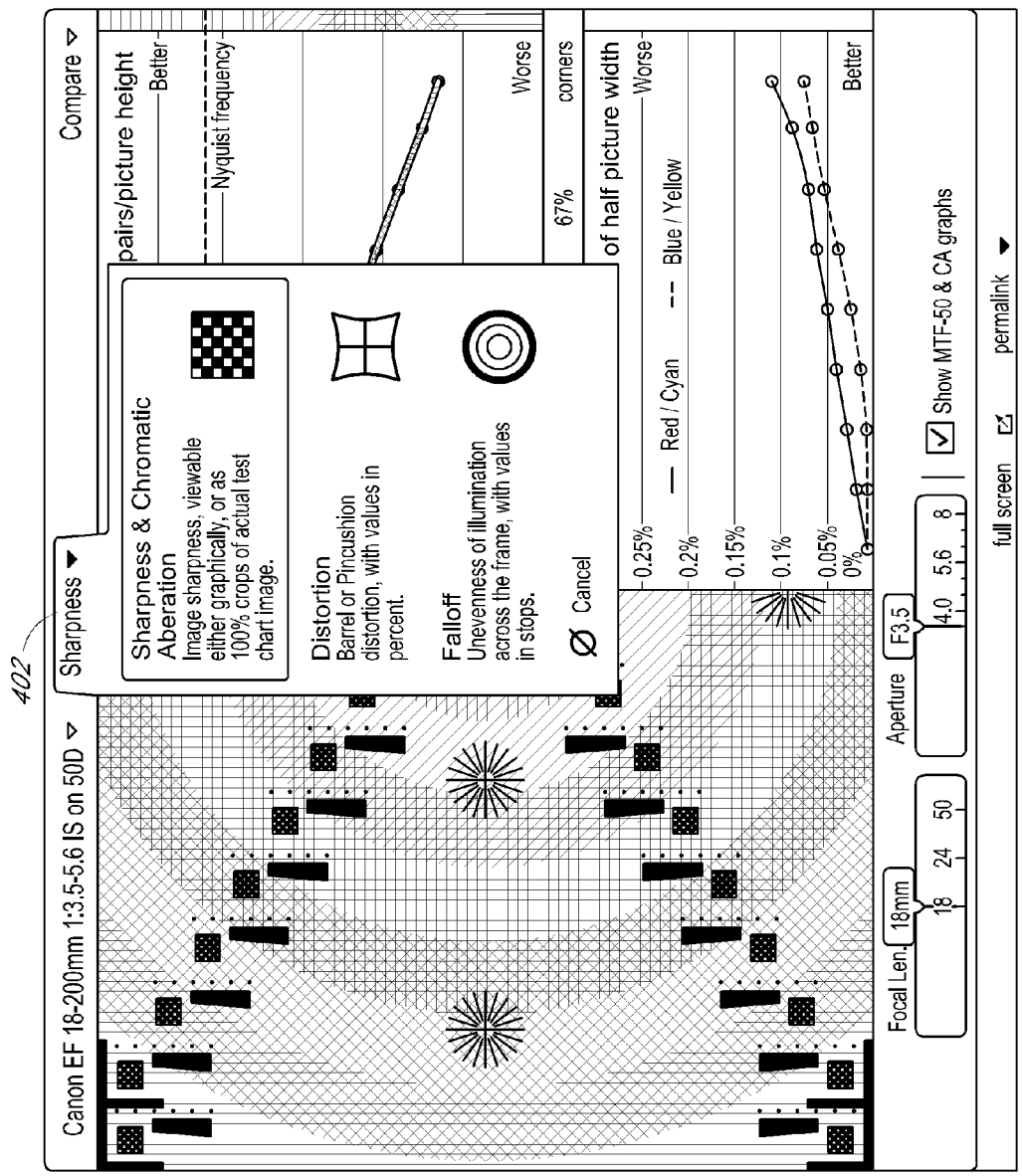
FIG. 4 illustrates an example embodiment of a lens attributes selection user interface.

FIG. 4 illustrates an attributes selection menu 402 in expanded, drop down form. The attributes selection menu 402 lists lens attributes from which the user can select (e.g., sharpness and chromatic aberration, distortion, falloff). Optionally, as illustrated, the menu 402 includes an explanation and an illustration for each selection that describes textually and visually the attribute for which data and analysis will be provided.

Figure 5A:
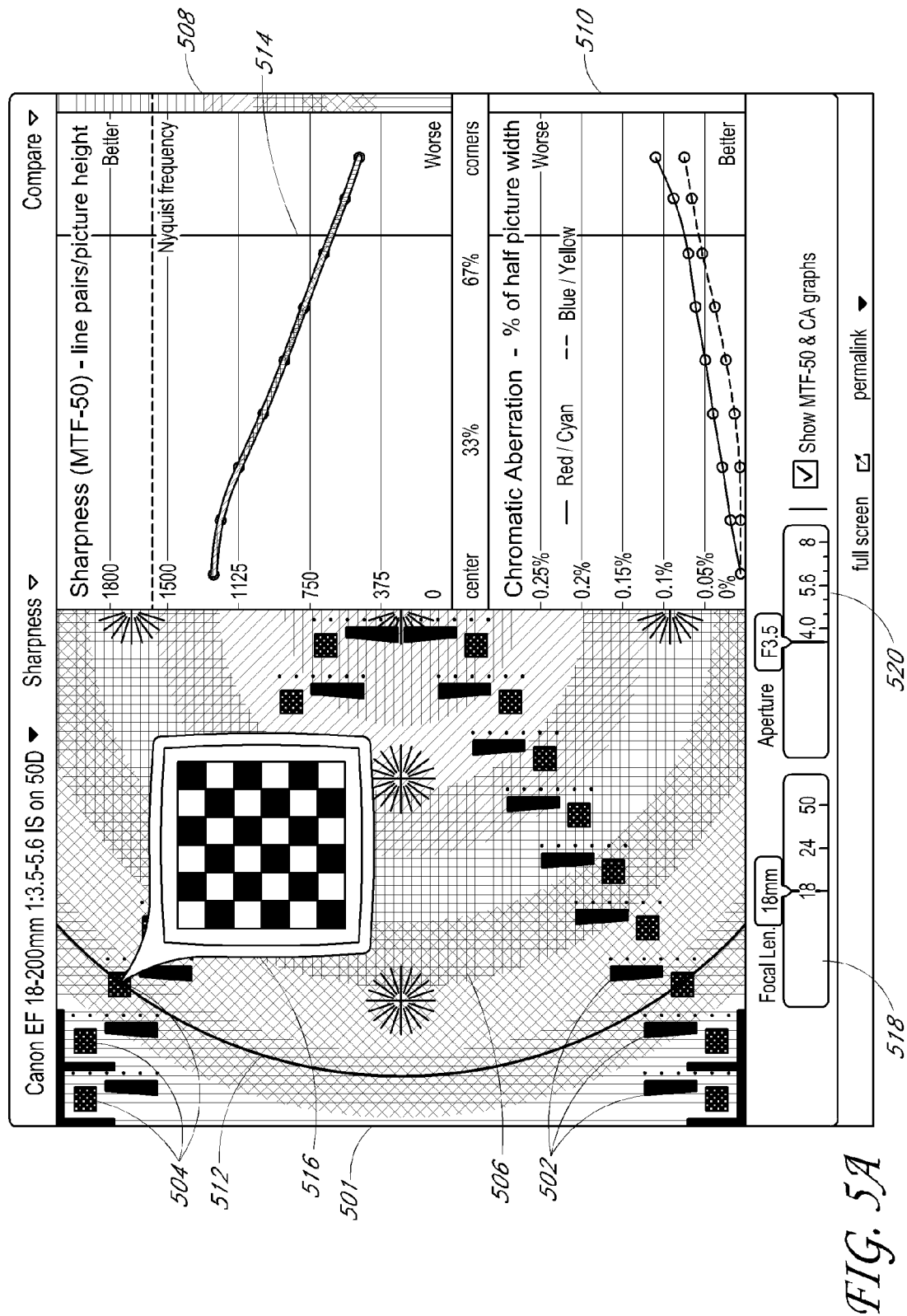
FIGS. 5A-C illustrate example embodiments of the interactive user interface providing lens sharpness and chromatic aberration analysis.

FIG. 5A illustrates the interactive user interface with the sharpness attribute selected.

The user interface displays, via panel 501, sharpness variation of a lens across an image frame at one focal length or a range of focal lengths (e.g., for a zoom lens) and for one or more apertures, wherein a color spectrum is used to represent sharpness. When the cursor is placed over a location in the frame, a sharpness target (a checker-board pattern in the illustrated example) appears at that location to indicate the sharpness at that position in the frame.

In particular, in the illustrated example an underlying image (e.g., a black image) provides a representation of a sharpness test chart, showing the locations of the slanted-edge test patterns (wedges 502). In this example, the locations of slanted-edge test patterns 502 from which sharpness data is measured are displayed, and a series of test (e.g., checkerboard) patterns which give visual representations of the effect of the lens sharpness on the appearance of the test pattern are further provided. Icons 504 are positioned to indicate where actual images of a test pattern 516 (used to generate data for the user interface) are available. Optionally, no more than a single actual test pattern image 516 is displayed at a time. Optionally, multiple images corresponding to different points are displayed at the same time.

In particular, the test image (e.g., a checkerboard pattern) 516, is selectively displayed which provides a visual indication of what a specific combination of sharpness and chromatic aberration actually look like, optionally using an actual image of the test image captured using the lens. In the illustrated example, if the user moves a cursor over one of the checkerboard icons 504 on the chart, an image (e.g., a 100% crop or other crop from an actual corresponding test image) that was used to generate the data is displayed. This enables a user to actually see what measured point in the frame really looks like. Optionally, the test image (e.g., a checkerboard pattern) is selected to provide high contrast and sharp white/black transitions, to thereby to represent a worst-case or very challenging scenario for the lens's imaging performance, wherein typical images (e.g., of a person, scenery, etc.) will not be perceived by a typical user to have such visible softness.

As discussed above, a color gradient 506 is provided (overlying the underlying image of the sharpness test chart representation in this example), indicating the measured sharpness across the frame, wherein the color indicates the lens sharpness (line pairs/picture height) at various frame locations. For example, the color gradient may range from blue for best sharpness, green for somewhat lower sharpness, yellow for still lower sharpness, to magenta for worst sharpness. Other color combinations or a grayscale may also be used to provide such sharpness information.

Thus, for the example lens being analyzed, toward the right center of the display 501 (corresponding to the image center), the color gradient is blue, and the color gradient shows declining sharpness performance as the distance from the image center increases, wherein at the outer edges the gradient is magenta.

The illustrated interactive user interface further includes optional graphs 508, 510 corresponding, respectively, to sharpness and chromatic aberration. The sharpness graph 508 in this example illustrates a Modulation Transfer Function (MTF) value referred to as MTF50, which is considered to correlate well with perceived sharpness.

The y-axis of the graph 508 is in units of line pairs per picture height, and the x-axis represents the distance from the image centre along the diagonal to the image corners. This scale enables direct comparison between camera systems with different sensor sizes and aspect ratios.

As can be seen in the illustrated example graph 508, for the selected lens, camera body, aperture setting, and focal length setting, the sharpness declines almost linearly from the image center to the image corners. In this example, the graph 508 is based on a plurality of data points (e.g., 8 or 9 data points, wherein a data point corresponds to a dot on the line 514, although fewer or additional data points can be used), wherein each data point optionally corresponds an average of a plurality of measurements (e.g., from 2 or 4 measurements, or other number of measurements). In this example, the focal length control 518 has been set (e.g., by a system operator or the end user) to 18 mm and the aperture control 520 has been set to F3.5. Of course other combinations of lens, body, and settings may result in a different profile, as discussed below with respect to FIG. 5C.

The chromatic aberration for different colors/frequencies (e.g., red/cyan, blue/yellow) is presented in the chromatic aberration graph 510. The shapes of the chromatic aberration profiles also may be significant in evaluating a lens, as the closer the profiles are to linear, the better the correction that is likely to be achieved in post-processing. In particular, in the illustrated example the lens' chromatic aberration characteristics are graphed, where the chromatic aberration corresponds to the amount by which the red/cyan and blue/yellow channel components of the test patterns are displaced from their 'correct' position (using the green channel as the reference in this example). The y-axis corresponds to the width of color fringing across the frame, where the higher the value, the more visible fringing will be. The illustrated example chart 510 also depicts a prediction of the color of fringing which will be produced; wherein a red graphed line indicates red/cyan fringing and a blue graphed line indicates blue/yellow fringing, and wherein a combination of the two resulting in green/magenta fringing. In this example, the graph 510 is based on a plurality of data points (e.g., 8 or 9 data points, wherein a data point corresponds to a dot on the line 514, although fewer or additional data points can be used), wherein each data point optionally corresponds an average of a plurality of measurements (e.g., from 2 or 4 measurements, or other number of measurements).

To provide enhanced visualization as to what point in the frame a specific measurement corresponds to, an indicator, optionally in the form of a thin circular line 512 (which may be in a highly visible color, such as red or other color, and may define an arc of a at least a portion of a circle), "follows" the cursor as the user moves the cursor over the display to thereby show the radius around the image center being viewed. A corresponding vertical line 514 (optionally in the same color as line 512) positioned on the sharpness graph 508 and the chromatic aberration graph 510 automatically moves in conjunction with the movement and change in radius of the circular line 512 to show the corresponding sharpness and chromatic aberration performance via the graphs 508, 510. Thus, as the cursor moves out or in, the radius of the arc 512 increases or decreases, with a corresponding movement of the line 514 in the sharpness and chromatic aberration graphs 508, 510. Thus, the cursor in the frame 501 is coupled to the vertical line 514 (or other type of indicator/cursor) in the graphs 508, 510.

Figure 5B:
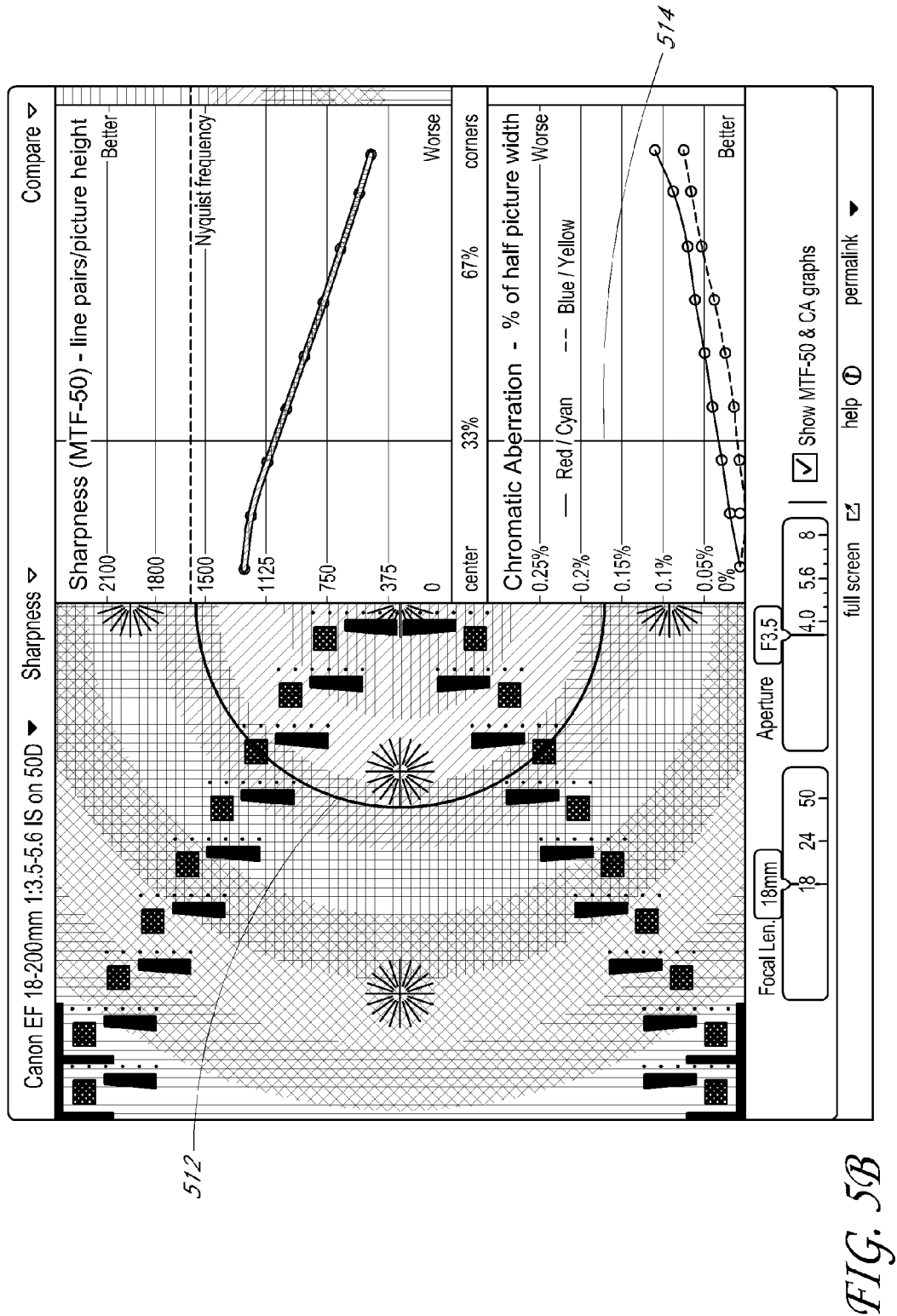

FIG. 5B illustrates the same user interface as that illustrated in FIG. 5A, except the user has moved the cursor and the user interface has tracked the cursor movement by moving the circular line 512 accordingly to thereby show the radius now being viewed. The line 514 on the sharpness graph 508 and chromatic aberration graph has automatically been correspondingly moved by the interactive user interface to provide sharpness and chromatic aberration data at the selected radius. At this smaller radius around the image center (as compared to that in FIG. 5A), the line 514 indicates that sharpness has improved and chromatic aberration has decreased.

Figure 5C:
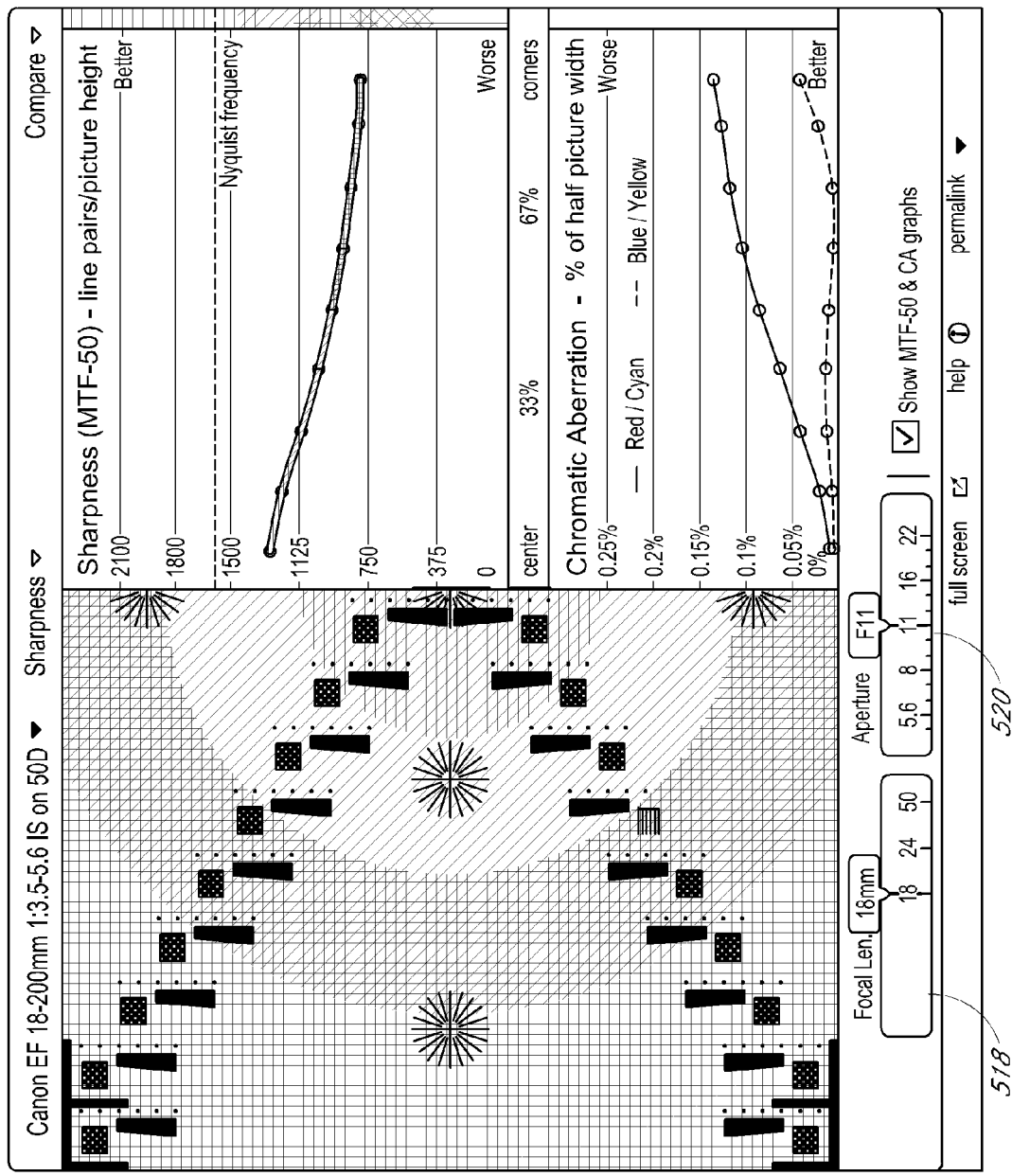

FIG. 5C illustrates the same user interface as that illustrated in FIG. 5A, except the user has changed the aperture setting via the aperture control 520 from F3.5 to F11. The sharpness and chromatic aberration graphs correspondingly provide graphs for the sharpness and chromatic aberration lens performance at the combination of a focal length of 18 mm and an aperture of F11. In the illustrated example, the sharpness line in graph 508 has flattened somewhat, indicating that the sharpness performance does not degrade as much in toward the image corners as compared to the performance when the aperture was F3.5. With respect to chromatic aberration, the graph 510 indicates that at the current aperture setting, the overall performance for red/cyan has improved, while the overall performance for blue yellow has degraded as compared to the performance when the aperture was F3.5. Thus, the user can experiment with different combinations of focal length and aperture and see the effect on lens performance.

Figure 6:
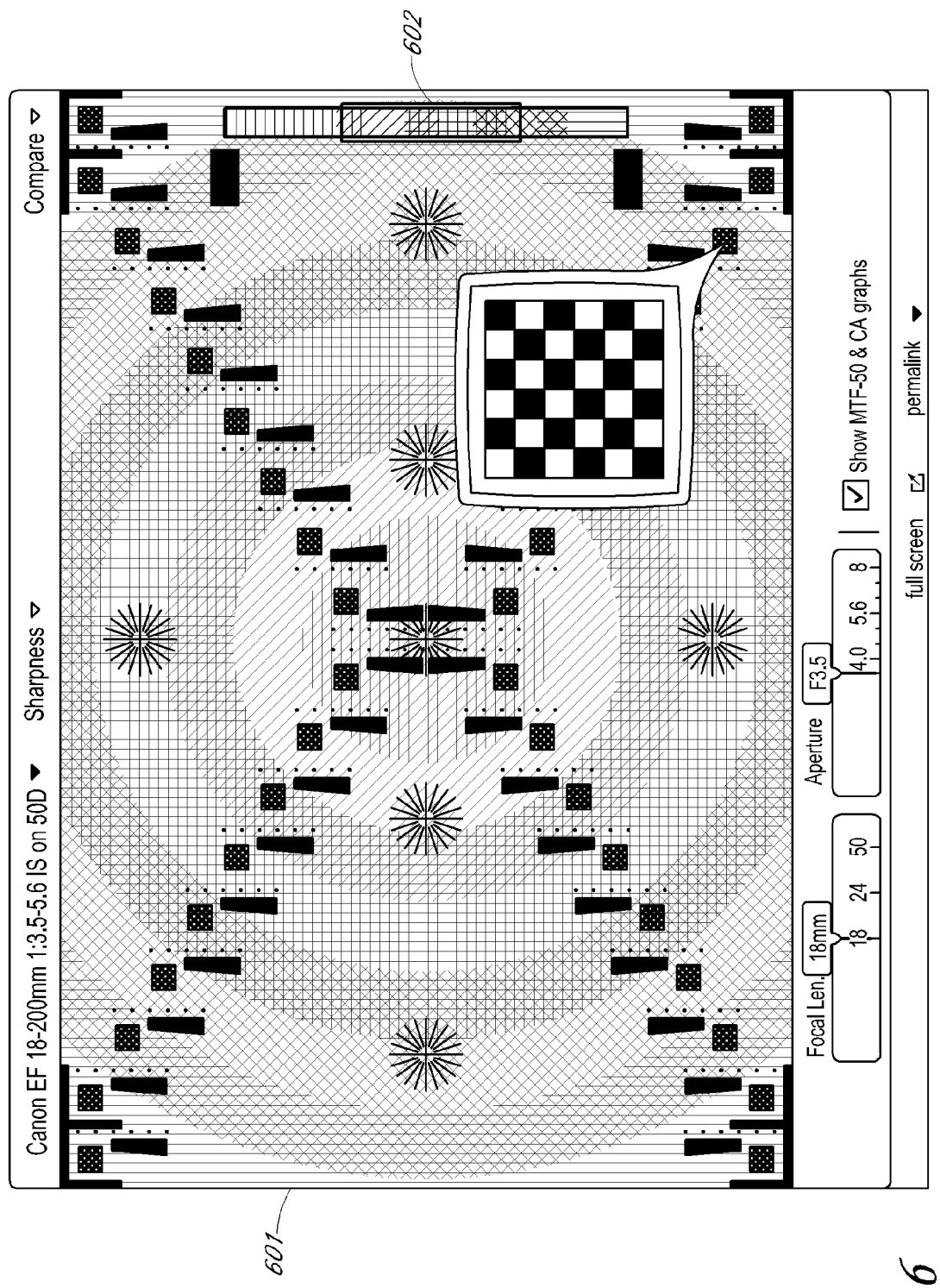
FIG. 6 illustrates an example embodiment of a sharpness analysis across an image frame.

FIG. 6 illustrates the user interface of FIG. 5 with the sharpness and chromatic aberration graphs turned off/hidden. This enables panel 601 to depict the sharpness across the entire frame, where the user can select and view checkerboard patterns across all four diagonals. On the right of the user interface, a 'belt buckle' display 602 illustrates the range/distribution of sharpness values across the frame for the specified focal length and aperture (f-number) for a specific lens using a color gradient as similarly discussed above with respect to panel 501.

Figure 7:
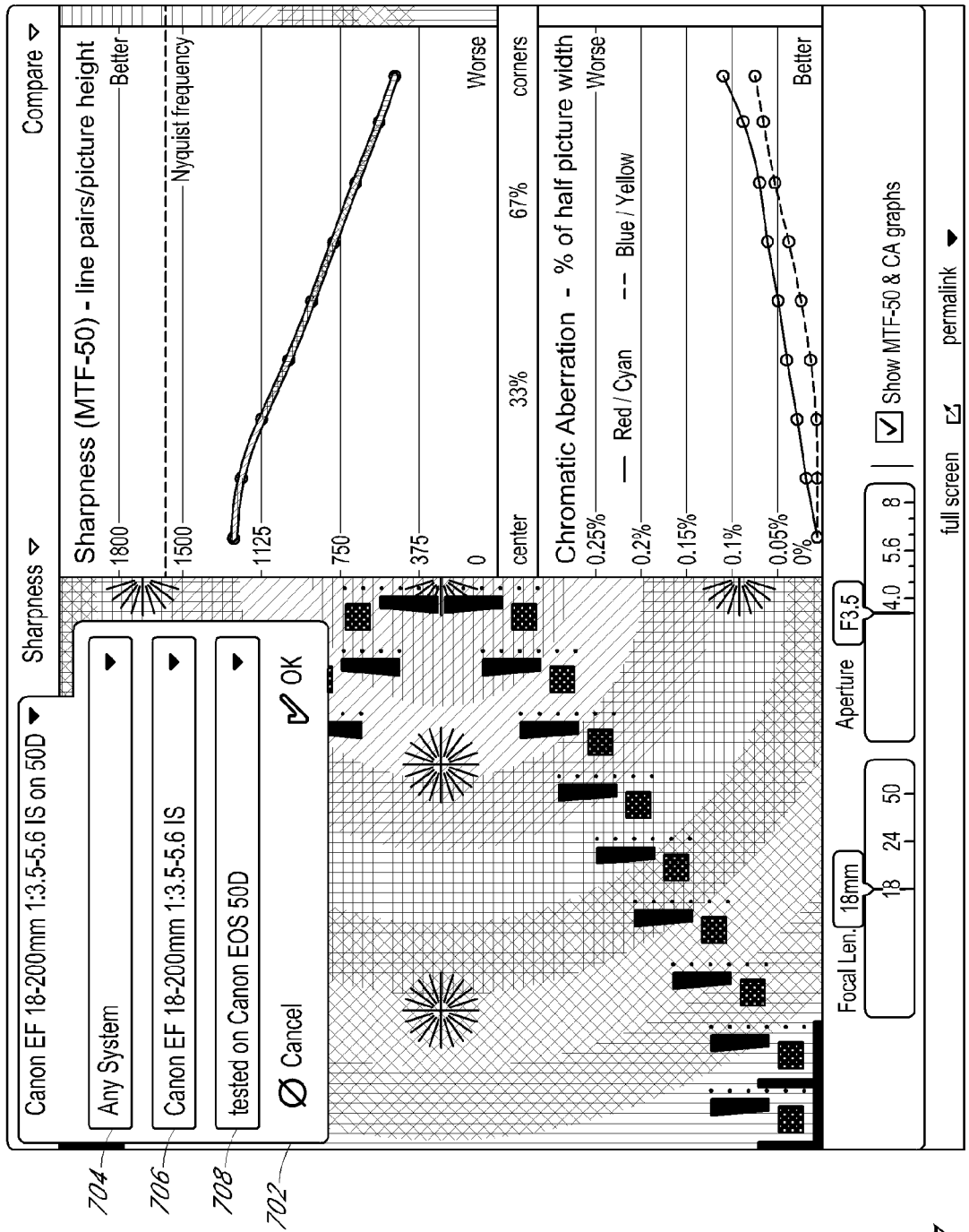
FIG. 7 illustrates an example embodiment of a lens/body selection menu.

FIG. 7 illustrates a selection menu interface 702 including submenus 704, 706, 708. Submenu 706 enables the user to select the lens for which analysis is to be provided. Submenu 704 enables the user to select the system (e.g., by the manufacturer and/or the camera image sensor's crop factor). Submenu 708 enables the user to select the camera body used when capturing test images used in characterizing the selected lens. Optionally, in a review page (e.g., a formal lens review) the user may be inhibited from selecting a different lens than that presented. Optionally, in the review page, if the user activates a control (e.g., a full screen control), a user interface is then provided via which the user can select a different lens.

Figure 8:
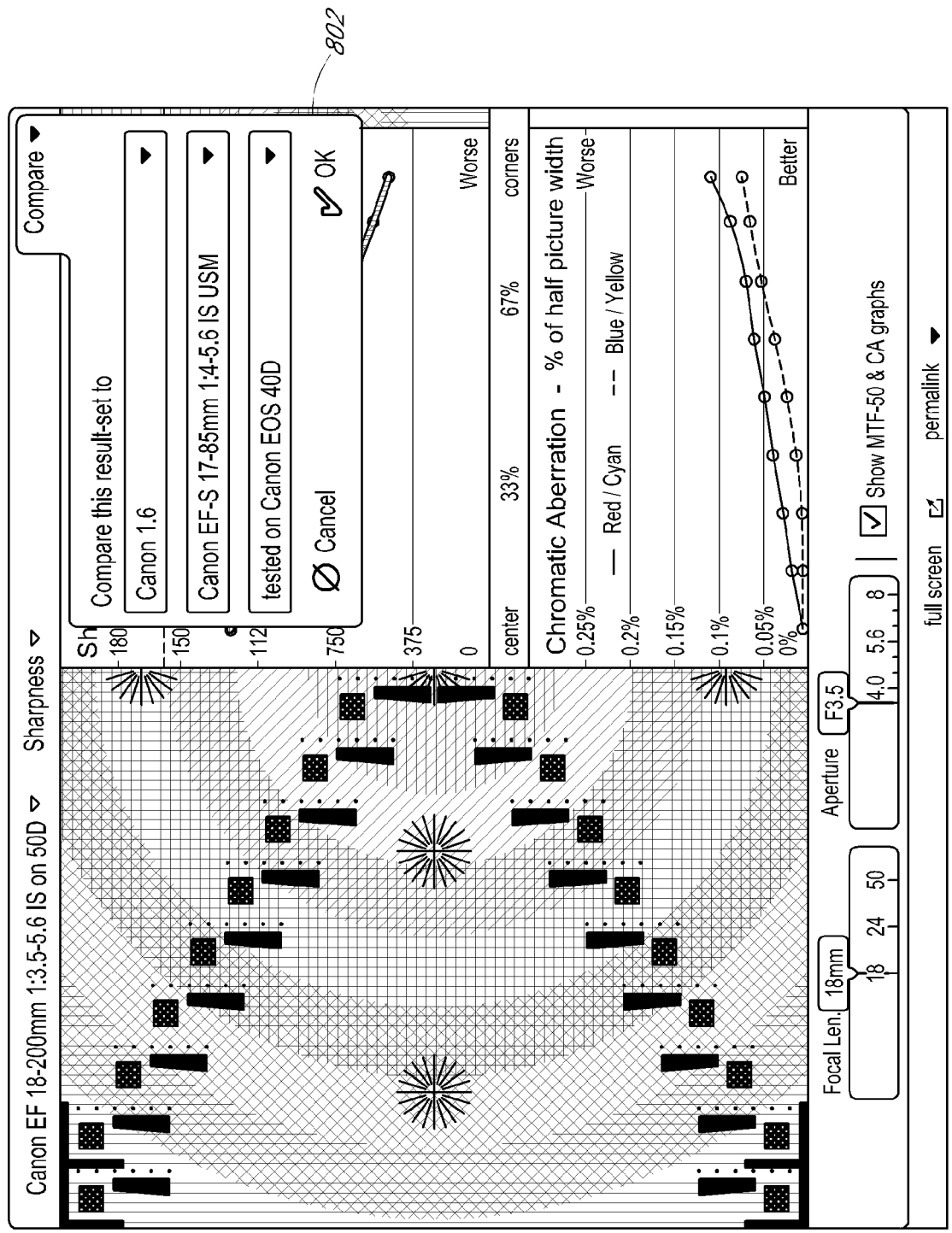
FIG. 8 illustrates an example embodiment of a lens comparison selection menu.

FIG. 8 illustrates a lens comparison selection menu 802 enabling the user to select multiple lenses, wherein the interactive user interface will display attributes of the selected lenses for comparison (e.g., side by side, one above the other, or via additional graph lines in the graphs 508, 510). When selecting the lenses to be compared, the user can further select the system and/or camera test body via corresponding menus as similarly discussed above with respect to FIG. 7. Optionally, the menu selections for camera bodies list the pixel count and imager size and/or a camera type classification indication for each body so that the user can select camera bodies that have sufficient similarities so that the differences in the camera bodies will not obscure the lens performance.

FIG. 9 illustrates the interactive user interface display test results for two lenses selected for comparison. Lens/body/system selection menus, such as those described above with respect to FIGS. 5A-C are available for both of the lenses, enabling the user to freely switch lenses, bodies, and/or systems for comparison. The focal lengths and apertures (f-numbers) can be varied and the results will be updated to correspond to the results for that focal length and f-number.

Test Image Capture Process

Figure 10:
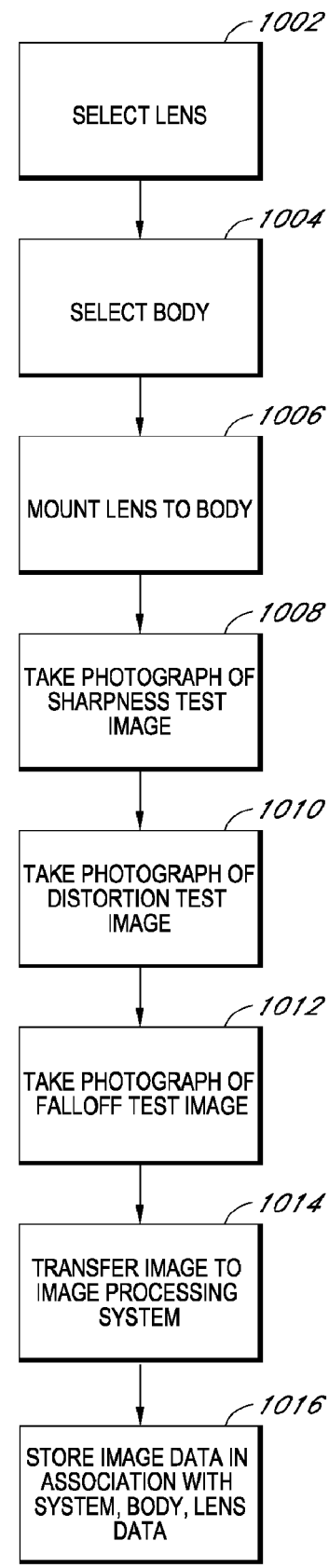
FIG. 10 illustrates an example embodiment of a test image capture process.

FIG. 10 illustrates an example embodiment of a test image capture process. In the following example, it is assumed that the lens is a removable lens, enabling the camera body to be selected separately from the lens. However, a similar process is used where the lens is fixed to the camera body, except the entire camera system (which includes the body and integral lens) is selected for test, rather then the body and lens separately.

At state 1002, a selection is made of the lens to be tested. The selection can be performed manually by the test operator, selected based on a designation accessed from a file stored in computer readable memory and accessed via a computer system, selected in response to a user request (e.g., where the request was transmitted over a network via email, via a review website, via an online catalog that offers lenses and/or other camera equipment for sale), or otherwise selected.

At state 1004, a selection is made of the camera body to be used in performing the test. The camera body can be selected using a technique as similarly described above with respect to state 1002 or otherwise, with the added constraint that the body needs to be compatible with the lens (e.g., where the body lens mount will mate with the lens). The determination as to which body is compatible with the lens may be made manually by the test operator. In addition or instead, the determination as to which body is compatible with the lens may be made via a compatibility program executing on a computer system that accepts a user entry designating the lens to be tested, searches through a database listing with bodies are compatible with a given lens (or lens type/mounting types), and outputs a listing of compatible bodies.

At state 1006, the selected lens is mounted to the selected camera body, and the body is mounted to a stand (e.g., a tripod or other stand). The sharpness test image is selected and mounted (e.g., on a stand, wall, or otherwise). The test image (e.g., a slanted edge and/or checkerboard pattern) is selected to provide high contrast and sharp white/black transitions, to thereby to represent a worst-case or very challenging scenario for the lens' imaging performance.

At state 1008, the lighting is set as desired (e.g., by selecting the number of lights, the light wattage, the light positioning, the selection and positioning of diffusers and/or reflectors (if any), etc.). The lens focal length is set (if the lens has an adjustable focal length), the aperture is set (if the lens/body provide for user selection of aperture), and focusing is performed (e.g., automatically by the camera or manually by the test operator). The selection of the focal length and aperture may be performed at the test operator's discretion, based on predefined test criteria (optionally stored in and accessed from computer readable memory), in response to a user request, or otherwise. Optionally, images are captured using some or all of the focal lengths marked on a lens, optionally using whole stop aperture increments for zoom lenses, and optionally using third stop increments for prime lenses, although other aperture increments can be used.

Optionally, other operating settings may also be adjusted, such as shutter speed, metering mode, and/or ISO speed. The test operator then operates the camera shutter and captures the sharpness test image in a photograph (e.g., a digital photograph stored in computer readable memory). The test operator then may change the focal length and/or aperture once or repeatedly and capture an image for some or all of the desired combinations of focal lengths and aperture.

The images may be stored in association with metadata identifying the camera body, the lens, the aperture setting, the focal length setting, orientation, shutter speed used, metering mode used, ISO speed information, and/or other data. For example, some cameras store image data using the Exchangeable image file format (EXIF) or other format (e.g., Extensible Metadata Platform (XMP)) that stores some or all of the following information data/time, camera settings (e.g., static data, such as camera model and make, and information that varies with each image such as orientation, aperture, shutter speed, focal length, metering mode, and ISO speed information), a thumbnail for previewing the picture, descriptions and copyright information, and/or other information. Some or all of this metadata can later be accessed from memory and presented to a user of the interactive user interface in conjunction with the characterization results.

At state 1010, a distortion test image is mounted, and one or more images are captured and stored at one or more aperture and focal length combinations as similarly described with respect to state 1008. Other camera settings may also be adjusted, as may be the lighting and other variables. The images may be stored with associated metadata, as similarly discussed above.

At state 1012, a falloff test image is mounted (which may be an even, white surface or other test image), and one or more images are captured and stored at one or more aperture and focal length combinations as similarly described with respect to state 1008. Other camera settings may also be adjusted, as may be the lighting and other variables. For example, a highly diffusing filter may be positioned between the lens and the test image. The images may be stored with associated metadata, as similarly discussed above.

At state 1014, the image data (optionally including some or all of the metadata discussed herein) is transferred to an image processing system that will perform data analysis and transformation. For example, the image data may be transferred via a wired or wireless connection with the camera body or

```
<LensReview ID="34" LensID="20" LensName="Canon
EF 18-200 mm 1:3.5-5.6 IS" BodyID="11"    BodyName="Canon
EOS   50D"   GeneratorVersion="1.0.0.0" GeneratedDate=
"2008-10-10T14:04:35">
```

2) Sharpness and Chromatic Aberration Test results. The corresponding focal length and aperture combination is identified, as is the crop factor, and the aperture value (AV). In this example, for a given focal length and aperture combination a subsection <MTFs> is provided, which contains the sharpness and chromatic aberration data (e.g., graph axis values for a data point) used to generate the plots (e.g., by the interactive user interface). In the example provided below, 'Rho' is the x-axis value a given data point on the graph, 'Linewidths' MTF50 provides the corresponding y-axis value, 'RedMisReg' provides the Red Channel chromatic aberration misregistration value, and 'BlueMisReg' provides the Blue Channel chromatic aberration misregistration value.

A crops subsection <Crops> describes the locations and sizes of the "popup" test image crops (e.g., the checkerboard image 516 illustrated in FIG. 5A), where the test image crops optionally are stored as separate files and served to the interactive user interface at the user's request.

Example sharpness and chromatic aberration test results:

```
<Results>
- <Result ProcessUri="http://schema.[URL]/processes/lens/sharpness/v1">
    <FLAperture FocalLength="18" CropFactor="1.6" AV="3.6670" />
+ <SharpnessTestResult>
- <MTFs>
    <MTF   Rho="0.0710"   LineWidths="1258.61"   RedMisReg="0.002"
BlueMisReg="0.003" />
    <MTF   Rho="0.1770"   LineWidths="1215.99"   RedMisReg="0.017"
BlueMisReg="0.006" />
    ....
    </MTFs>
- <Crops>
    <Crop   CentreTheta="2.5632"   CentreRho="0.9412"   Width="117"
Height="117" />
    <Crop   CentreTheta="-2.5616"   CentreRho="0.9376"   Width="117"
Height="117" />
    .....
    </Crops>
    </SharpnessTestResult>
    </Result>
- <Result ProcessUri="http://schema.dpreview.com/processes/lens/sharpness/v1">
    <FLAperture FocalLength="18" CropFactor="1.6" AV="4.0000" />
- <SharpnessTestResult>
- <MTFs>
``` via a removable memory module removed from the camera and inserted into a memory reader coupled to the processing system. At state 1016, the image processing system stores in computer readable memory the image data, including the image itself, and the metadata in association with the image. The data is then analyzed to generate the desired data, such as sharpness data, chromatic aberration data, falloff data, distortion data, and/or other data.

The analyzed data can be stored in a file. For example, the file can have the following example format and sections (although other formats and sections can be used):

1) Header. For example, the header can include one or more lines containing lens information, body information, and review information (e.g., lens review identifier, lens numerical identifier, lens name, numerical body identifier, body name, the version of the software used to generate the data, and the date the data was generated). The following example illustrates an example header:

A line in the lens data file defines the position of given crop on the chart using polar coordinates. In this example, the test image file is named according to the same coordinates, allowing the interactive user interface to generate the filename to request at each location using that information, optionally without needing additional information. For example, in the lens data xml file, under the sub-heading:

<FLAperture   FocalLength="18"   CropFactor="1.6" AV="3.6670"/>

There is a position entry:

<Crop   CentreTheta="0.696"   CentreRho="0.5669" Width="117" Height="117"/>

This instructs the interactive user interface to associate a crop at 18 mm F3.5 (Av 3.667) with position (0.696. 0.5669); and if the user hovers their cursor in this location, the filename to request from the edge cache will be:

18 mm_f3.5_0.696_0.5669.jpg

The Width and Height fields instruct the interactive user interface as to the size of the crop, and therefore how big the popup to display the crop should be.

3) Distortion Test results. For a given focal length/aperture combination, this section describes the lines (e.g., using a Rho-Theta system to a position fix use to specify the position of the intersection of two lines) in the distortion grid as a series of vectors. An example is provided below

```
-<DistortionTestResult
    LongEdgeDistortion="3.3859" ShortEdgeDistortion="0.5988">
- <DistortionPoints>
- <Line>
    <From Theta="-3.0322" Rho="0.7924" />
    <To Theta="-3.1402" Rho="0.7880" />
  </Line>
```

4) Falloff Test results. This section describes the shapes of the curves used in the falloff display as a series of vectors, and describes the shades of grey (band luminance) in which the results should be rendered.

```
<Result ProcessUri="http://schema.[URL]/processes/lens/falloff/v1">
    <FLAperture FocalLength="18" CropFactor="1.6" AV=
    "3.6670" />
- <FalloffTestResult OverallLuminanceDelta="29.0647">
- <Bands>
- <Band Luminance="-94.3582222222217" EV="-1.667"
MaxRadius="0.9988">
    <Point Theta="-2.5536" Rho="0.9988" />
```

Thus, using the optional format described above, the lens data may be stored in a relatively small file (e.g., using an example embodiment, 49 focal length/aperture combinations are described in using a 510 kB file, representing data obtained from 228 test images totaling 2.25 Gb in size) which is served to the interactive user interface when the corresponding lens is selected. If a request for a change in focal length, aperture, or properties display (sharpness, distortion, falloff) is received from the user, the user interface reads the relevant data from this file (which, for example, may be provided as an XML file) and converts it to the appropriate graphics, such as those illustrated in the user interface described herein. Because, in this example embodiment, the lens data file is much smaller than the large numbers of test image files it is derived from, the lens data can be quickly transmitted to the user using relatively low communication bandwidth.

Processing and Display of Image Data by Interactive User Interface'

Figure 11:
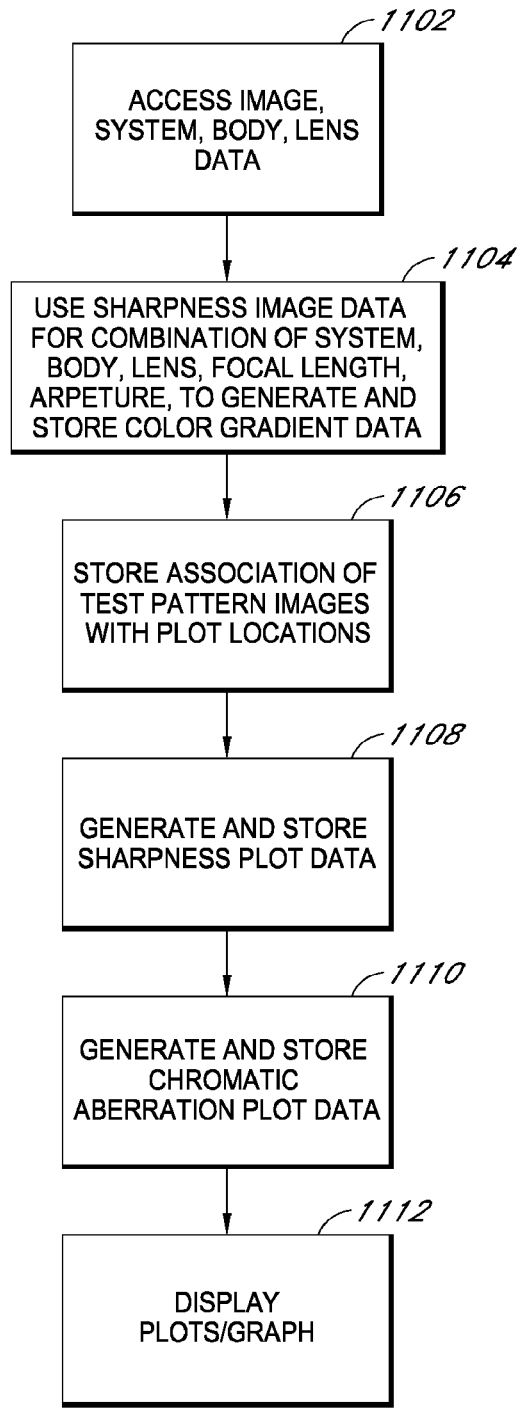
FIG. 11 illustrates an example embodiment of test image data processing.

FIG. 11 illustrates an example embodiment of test image data processing. In the following example, the interactive user interface is configured to process test data for presentation to the user. In particular, the interactive user interface accesses test data (e.g., stored on a remote database, such as database 206 illustrated in FIG. 2) transmitted over a network to a client terminal hosting the interactive user interface (e.g., terminal 210). The interactive user interface then processes the test data and formats and presents the data to the user as described herein with respect to the illustrative example user interfaces. Because the basic data (with no or relatively less processing) is transmitted to the client terminal over the network, this approach greatly reduces the payload size and the bandwidth needed to transfer lens presentation data to the user as compared with simply transferring static graphs of lens performance in the form of a JPEG, FLASH, PDF, or other relatively large image file from a web server to the user terminal for presentation to the user.

Further, by having the interactive user interface process the test data for presentation to the user, the test data can be dynamically formatted and much more quickly presented to the user in response to user requests as compared to having to continuously access static graphs and the like from a remote database (e.g., to provide the side-by-side comparison data, changing the size of the various sub-interfaces, to provide dynamic control of the thin line 512, etc). Still further, the foregoing approach enables the data representation to be changed by providing a modified version of the interactive user interface, rather than by having to recapture data or remotely reformat data. Thus, for example, overlays of other data (e.g., distortion data/graph, falloff data/graph) can be provided with respect to the sharpness graph, the chromatic aberration graph, and/or the sharpness color gradient chat. Similarly, if new lens data and/or camera body data is captured, the data can be added/appended to an existing file (e.g., stored on database 206 or elsewhere), and a new version of the widget can be provided to accesses and format the new data for presentation to the user, optionally in conjunction with the previously captured data.

Further, the states of the process may be performed in a different order.

At state 1102, the interactive user interface accesses from memory test data corresponding to photographs of a sharpness test chart, test pattern images (to be accessed by the user via the sharpness color gradient plot), positions and sizes of test pattern image crops, and information identifying static and dynamic camera settings used to capture the images (e.g., some or all of the following metadata: camera body identifier, lens identifier, aperture setting, focal length setting, ISO speed setting, focusing mode setting). For example, the foregoing data may have been transmitted to the interactive user interface from the database 206 via the web server system 208. As discussed above with respect to FIG. 10, the test data may be in the form of a file including some of all of the following components: a header, sharpness test results, chromatic aberration test results, distortion test results, and falloff test results. The file may include data for all lens focal length/aperture combinations for which test data is available, or a subset thereof (wherein a subset may include one or more focal length/aperture combinations). Further, the file may optionally include test data for all focal length/aperture/camera body combinations for which test data is available, or a subset thereof (wherein a subset may include one or more focal length/aperture/camera body combinations).

Optionally, with respect to the test pattern images, the test pattern images (e.g., the checkerboard pattern images) are served by the system server for display to the end user via the interactive user interface one (or other specified quantity) at a time, in response to the interactive user interface detecting that the user is hovering the cursor over a corresponding relevant point on the chart (or takes other specified action, such as clicking on an specified icon or other link), and issuing a corresponding test pattern image request. The request may optionally be issued in the form discussed above with respect to FIG. 10 wherein the polar coordinates are used to generate the requested filename.

The test pattern images are optionally in the form of individual files (e.g., JPEG files, which may be for example 4-5 Kb in size, although other sizes and formats may be used). For the example analysis of the lens illustrated with respect to FIG. 5A, there are 1764 of test images (36 per shutter speed/aperture combination, of which there are 99), for total of 6.55 Mb of test pattern image data. The individual files are optionally served to the interactive user interface via edge caching to enhance image serving performance.

This optional technique enables a large amount of visual information on lens performance to be provided to the user without having to serve all the test image crops at once. For example, with respect to the foregoing illustrative example, 4 Kb is transferred on demand per requested image, as compared to 6.55 Mb being transferred if the test images were loaded into a page all at once, which may be impractical in a static web page. Thus, large amounts of visual information with respect to a tested lens can be provided without unacceptably degrading performance and without making page loading unacceptably slow.

At state 1104, the interactive user interface, using the processing power of the host (e.g., terminal 201), analyzes the test data and metadata and generates data which is to be used to plot a performance gradient for the corresponding aperture and focal length setting, such as that discussed above, wherein the gradient data indicates the sharpness across the image frame, and wherein various colors (or a grayscale) indicate the lens sharpness at various frame locations. For example, the interactive user interface maps sharpness measurements to color to generate the color gradient.

At state 1106, the interactive user interface stores an association of test pattern images with graphical data display plot locations, such as those discussed above with respect to FIG. 5A, so that the images may be displayed to the user.

At state 1108, sharpness plot data for the sharpness graph (e.g., such as that discussed above with respect to FIG. 5A) is generated by the interactive user interface using the test data and stored in computer readable memory (e.g., the host memory).

At state 1110, chromatic aberration plot data for the chromatic aberration graph (e.g., such as that discussed above with respect to FIG. 5A) is generated by the interactive user interface using the test data and stored in computer readable memory (e.g., the host memory).

At state 1112, the user interface presents one or more graphs/plots, such as those discussed above with respect to FIG. 5A.

While the above example illustrates an embodiment where the formatting of data for presentation is performed by the interactive user interface using the host terminal's processing power using test data transmitted from a remote system server, in addition or instead some or all of the graphs and other processed data can be generated and provided by a remote system (e.g., and stored in the form of a PDF, JPEG, FLASH, or other image/vector file). For example, the processing may optionally be performed via image processing system 204 or web server system 208 illustrated in FIG. 2, or otherwise, with the graphs and other formatted data stored in the database 206.

Interactive User Interface Process

Figure 12:
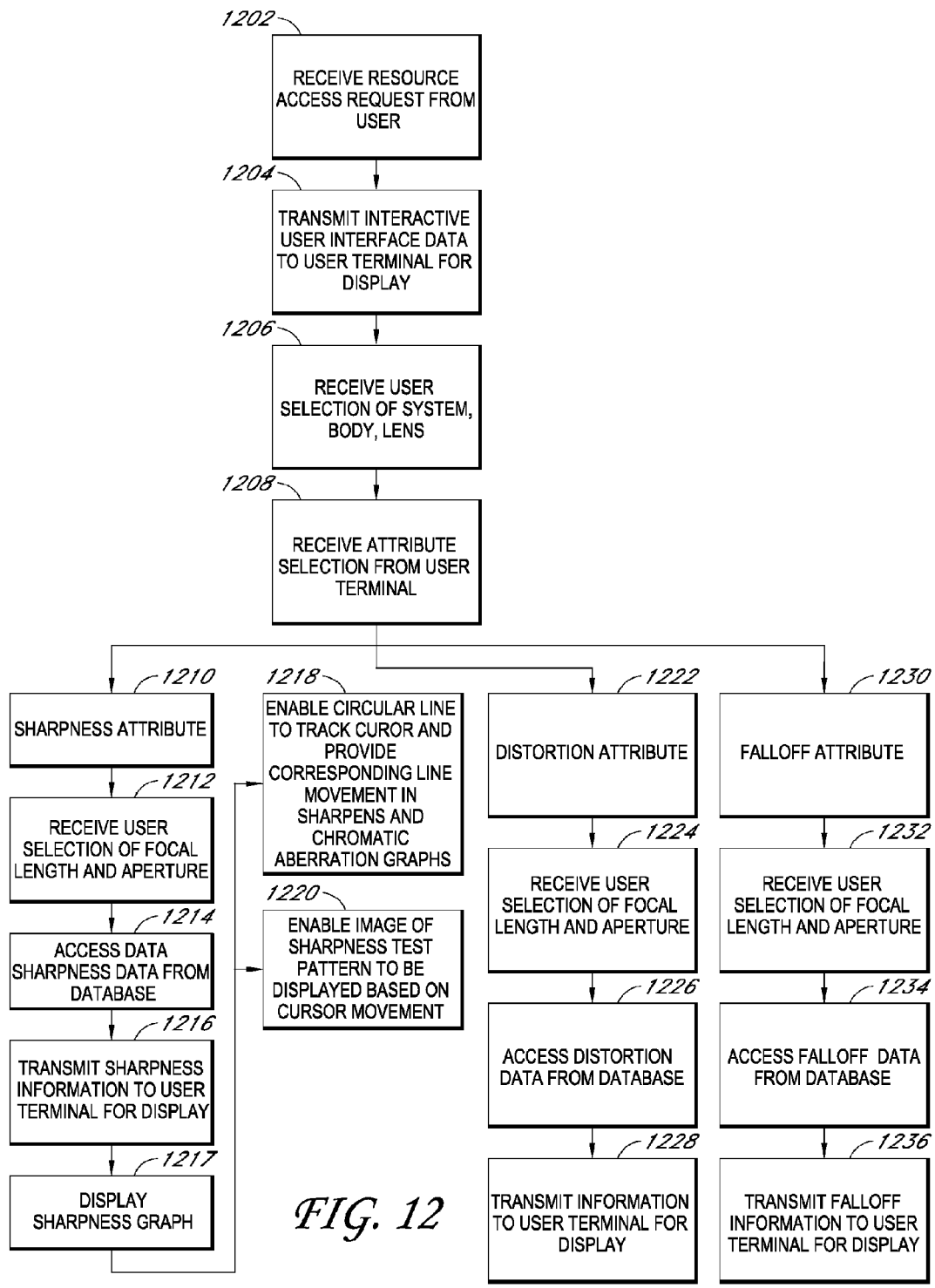
FIG. 12 illustrates an example embodiment for providing test image user interfaces and data to a user.

FIG. 12 illustrates an example embodiment for providing user interfaces and data to a user and for user navigation of the interactive user interface. The process, or portions thereof may be executed via the web server system 208 illustrated in FIG. 2, the user terminal, the image processing system 204, illustrated in FIG. 2, and/or other systems.

At state 1202, a user provides a request for the user interface. For example, a user using a terminal may enter a corresponding URL (uniform resource locator) into a browser address field or activate a link to access a Web page hosting the interactive user interface, or the user may request a download of an interactive user interface widget or program.

At state 1204, the interactive user interface is transmitted to the user terminal for display to the user. By way example and not limitation, the user interface may be in the form of a web page defined using HTML (hypertext mark-up language), XML (extended mark-up language), FLASH®, Silverlight™, JavaFX™, AJAX, other RIA (Rich Internet Application), and/or using other technologies. Optionally, the user may have previously specified user preferences via a user preference interface (e.g., transmitted from the server 208 to a browser hosted on terminal 210, or otherwise). For example, the user preferences may specify preferred axis scales for various graphs, color schemes, representation modes (e.g., graph types, such as line graph, bar graph, pie chart, etc.), the order and positioning of graphs, etc. In such a case, the preferences are retrieved from computer readable memory (e.g., via server 208 from database 206 and/or via terminal 210), and the interactive user interface will be correspondingly set up.

At state 1206, the receiving system (e.g., the web server) receives via the interactive user interface a user selection of some or all of the following:
  i. system
  ii. body
  iii. aperture
  iv. focal length For example, the user selection can be provided via the menus and controls discussed above with respect to FIGS. 5A-C.

At state 1208, the system receives via the user interface an attribute selection from the user. For example, the user selection can be made using the interface illustrated in FIG. 4, which enables the user to select sharpness, distortion, or falloff. Optionally, the user interface defaults to a certain attribute, such as sharpness, so that the user need not make any selection if the user is satisfied with the default.

If the user selected "sharpness", the process proceeds to state 1210. At state 1212, the system receives a user selection of a focal length and/or aperture, which may be provided via the user interfaces discussed above with respect to FIGS. 5A-C. Optionally, the user interface defaults to a certain focal length and/or aperture, so that the user need not make any selection if the user is satisfied with the default.

At state 1214, the system accesses sharpness and chromatic aberration data (e.g., test data) from a data store, such as database 206 discussed above with respect to FIG. 2, or a local user database. At state 1216, the data is transmitted from the system (if different than the user terminal) to the user terminal for display. For example, as similarly discussed with respect to FIG. 11, the data may optionally be pre-processed data, rather than pre-generated graphs provided via a JPEG file or other static file.

At state 1217, the interactive user interface formats the sharpness and chromatic aberration data for presentation to the user. For example, the interactive user interface may present the graphs illustrated in FIG. 5 using the process illustrated in FIG. 11.

At state 1218, the interactive user interface monitors and tracks the cursor motion, if any, over the panel 501. The interactive user interface causes the radius line and the vertical line in the sharpness and chromatic aberration graphs to correspondingly be repositioned, and in the case of the radius line, to alter its radius.

At state 1220, which may be performed in parallel with respect to one or more of the foregoing states, the interactive user interface monitors and tracks the cursor motion, if any, over the test pattern icons in panel 501, and accesses and provides for display the corresponding actual image of the test pattern. For example, as similarly descried above, the interactive user interface may issue a request for the image, wherein the image request is generated using the coordinates (e.g., the polar coordinates) of a corresponding test pattern icon.

If, at state 1208, the user selection of the distortion attribute was received, the process proceeds to state 1224. At state 1226, the system receives a user selection of a focal length and/or aperture, which may be provided via the user interfaces discussed above with respect to FIGS. 5A-C. Optionally, the user interface defaults to a certain focal length and/or aperture, so that the user need not make any selection if the user is satisfied with the default.

At state 1226, the system accesses distortion data from a data store, such as database 206 discussed above with respect to FIG. 2, or a local user database. At state 1228, the data is transmitted from the system (if different than the user terminal) to the user terminal for display. The display includes a direct representation of the grid pattern captured by the lens (e.g., transmitted to the user interface via the file discussed above with respect to FIG. 10), thereby demonstrating how lines will deviate from being rendered as perfectly straight. The degree of distortion along both axes of the frame may also be calculated and displayed to the user. This enables the user to view complexities in the distortion, and to aid the user in selecting appropriate correction parameters in the user's image manipulation software.

If, at state 1208, the user selection of the falloff attribute was received, the process proceeds to state 1230. At state 1232, the system receives a user selection of a focal length and/or aperture, which may be provided via the user interfaces discussed above with respect to FIGS. 5A-C. Optionally, the user interface defaults to a certain focal length and/or aperture, so that the user need not make any selection if the user is satisfied with the default.

At state 1234, the system accesses falloff data from a data store, such as database 206 discussed above with respect to FIG. 2, or a local user database. At state 1236, the data is transmitted from the system (if different than the user terminal) to the user terminal for display.

Thus, as described herein, methods and systems are provided that characterize lenses and camera bodies, format such characterization data for display to a user, transmits such data to a user terminal, and enables a user to access such data via an interactive user interface. In certain embodiments, the user may experiment with different combinations of camera elements and settings via the user interface so as to select a suitable lens and/or camera body.

While certain lens characteristics are discussed herein by way of illustrative example, other photography related characteristics (e.g., related to the camera body, lens, flash, filters, etc.) can also be measured, characterized and analyzed, with resulting information provided to a user via the interactive user interface or otherwise.

The various features and processes described above may be used independently of one another, or may be combined in various ways. All possible combinations and subcombinations are intended to fall within the scope of this disclosure. In addition, certain method or process steps may be omitted in some implementations and the steps may be performed in a different order.

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware. Further, components and tasks described herein can be implemented as web services.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A system comprising:
   at least one computing device comprising hardware;
   non-transitory computer readable memory comprising modules that when executed by the at least one computer device causes the at least one computing device to perform operations comprising:
   provide for display on a user terminal an interactive user interface, the interactive user interface including an interface that enables a user to select among at least a sharpness attribute and a distortion attribute;
   access from computer readable memory lens data corresponding to a user request, the user request comprising a selection of the sharpness attribute, wherein the lens data includes test data obtained via a first digital image frame captured using a first lens with a first focal length setting using a first aperture setting, wherein the first lens comprises an optical lens and the lens data includes sharpness data;
   transmit the lens data to the interactive user interface; and
   enable the interactive user interface to:
      display an identification of the first lens;
      display the first focal length setting used to capture the first digital image frame;
      display the first aperture setting used to capture the first digital image frame; and
      render a sharpness graph for the first lens, wherein the sharpness graph includes sharpness graph data generated at least partly based on the lens data by mapping sharpness to frame locations.

2. The system as defined in claim 1, wherein the lens data transmitted to the interactive user interface includes test data corresponding to a plurality of digital image frames captured using the first lens at a plurality of different apertures or focal lengths, or at both a plurality of different apertures and a plurality of different focal lengths.

3. The system as defined in claim 1, the operations further comprising:
   enable a control to be provided via the user terminal to receive a user selection of a second lens whose performance is to be compared with the first lens at the same focal length setting and aperture setting.

4. The system as defined in claim 1, wherein the interactive user interface further comprises a color gradient graph which maps sharpness to color.

5. The system as defined in claim 1, the operations further comprising:

provide for display on the user terminal a user interface, the user interface including a menu via which the user can specify a focal length setting;
receive a user selection of a second focal length setting;
locate in a database lens data corresponding to a previously captured second digital image frame captured using the first lens at the second focal length setting;
transmit the lens data corresponding to the previously captured second digital image frame to the interactive user interface, and enabling the interactive user interface to:
render a second sharpness graph, wherein the second sharpness graph includes sharpness graph data generated at least partly based on the lens data corresponding to the previously captured second digital image frame by mapping sharpness to frame locations of the second digital image frame;
display the first lens identifier;
display the second focal length setting; and
display the first aperture setting.

6. The system as defined in claim 1, the operations further comprising:
provide for display on the user terminal a user interface, the user interface including a menu via which the user can specify an aperture setting;
receive a user selection of a second aperture setting;
locate in a database lens data corresponding to a previously captured second digital image frame captured using the first lens at the second aperture setting;
transmit lens data corresponding to the previously captured second digital image frame to the interactive user interface, and enabling the interactive user interface to:
render a second sharpness graph, wherein the second sharpness graph includes sharpness graph data generated at least partly based on the lens data corresponding to the previously captured second digital image frame, by mapping sharpness to frame locations of the second digital image frame;
display the first lens identifier;
display the first focal length setting; and
display the second aperture setting.

7. The system as defined in claim 1, wherein the sharpness graph has a first axis corresponding to line pairs/picture height and has a second axis corresponding to distance from the firm image center along a diagonal to a first image corner.

8. The system as defined in claim 1, wherein the system comprises an image processing system, the operations further comprising using the image processing system to process, transform, and format image data captured via the first lens.

9. A computer implemented method comprising:
receiving over a network at a computer system comprising hardware a user request for lens performance data for a first lens from a user terminal, the user request including a selection among at least a sharpness attribute and a distortion attribute made via an attribute selection user interface;
wherein the first lens comprises an optical lens;
providing for display on the user terminal an interactive user interface;
accessing from computer readable memory, via the computer system, lens data corresponding to the user request, wherein the lens data includes test data obtained via a first digital image frame captured using the first lens with a first focal length setting using a first aperture setting, and where the lens data includes sharpness data; and
transmitting the lens data to the interactive user interface, and enabling the interactive user interface to:
display an identification of the first lens;
display the first focal length setting used to capture the first digital image frame;
display the first aperture setting used to capture the first digital image frame; and
render a sharpness graph for the first lens, wherein the sharpness graph includes sharpness graph data generated at least partly based on the lens data by mapping sharpness to frame locations.

10. The method as defined in claim 9, wherein the lens data transmitted to the interactive user interface includes test data corresponding to a plurality of digital image frames captured using the first lens at a plurality of different apertures or focal lengths, or at both a plurality of different apertures and a plurality of different focal lengths.

11. The method as defined in claim 9, the method further enabling a control to be provided via the user terminal to receive a user selection of a second lens whose performance is to be compared with the first lens at the same focal length setting and aperture setting.

12. The method as defined in claim 9, wherein the interactive user interface provides a rendering of a color gradient graph which maps sharpness to color.

13. The method as defined in claim 9, the method further comprising:
providing for display on the user terminal a user interface, the user interface including a menu via which the user can specify a focal length setting;
receiving at the computer system a user selection of a second focal length setting;
locating in a database lens data corresponding to a previously captured second digital image frame captured using the first lens at the second focal length setting;
transmitting the lens data corresponding to the previously captured second digital image frame to the interactive user interface, and enabling the interactive user interface to:
display second chromatic aberration graph data for a second chromatic aberration graph corresponding to at least one portion of the second frame;
display the first lens identifier;
display the second focal length setting; and
display the first aperture setting.

14. The method as defined in claim 9, the method further comprising:
providing for display on the user terminal a user interface, the user interface including a menu via which the user can specify an aperture setting;
receiving at the computer system a user selection of a second aperture setting;
locating in a database lens data corresponding to a previously captured second digital image frame captured using the first lens at the second aperture setting;
transmitting lens data corresponding to the previously captured second digital image frame to the interactive user interface, and enabling the interactive user interface to
render second chromatic aberration graph data for a second chromatic aberration graph corresponding to at least one portion of the second frame;
display the first lens identifier;
display the first focal length setting; and
display the second aperture setting.

15. The method as defined in claim 9, wherein the first interactive user interface is configured to cause a sharpness target photographic image to appear when the user places a cursor over a first location in the first image frame to thereby indicate the sharpness at that position in the first image frame.

16. The method as defined in claim 9, wherein the sharpness graph has a first axis corresponding to line pairs/picture height and has a second axis corresponding to distance from the firm image center along a diagonal to a first image corner.

17. The method as defined in claim 9, the method further comprising causing at least in part falloff data and distortion data for the first lens to be rendered on the user terminal.

18. The method as defined in claim 9, wherein the computer system comprises an image processing system, the method further comprising using the image processing system to process, transform, and format image data captured via the first lens.

19. The method as defined in claim 9, the method further comprising enabling the interactive user interface to render a sharpness graph for the first lens.

20. Non-transitory computer readable memory comprising program code that when executed by at least one computing device causes the at least one computing device to perform operations comprising:

providing for display on a user terminal an interactive user interface, the interactive user interface including an interface that enables a user to select among at least a sharpness attribute and a distortion attribute;

accessing from computer readable memory lens data corresponding to a user request, the user request comprising a selection of the sharpness attribute, wherein:

the lens data includes test data obtained via a first digital image frame captured using a first lens with a first focal length setting using a first aperture setting, and the first lens comprises an optical lens and the lens data includes sharpness data;

transmitting the lens data to the interactive user interface; and enabling the interactive user interface to:

display an identification of the first lens;

display the first focal length setting used to capture the first digital image frame;

display the first aperture setting used to capture the first digital image frame; and render a sharpness graph for the first lens, wherein the sharpness graph includes sharpness graph data generated at least partly based on the lens data by mapping sharpness to frame locations.

\* \* \* \* \*